United States Patent [19]

Hollenbeck et al.

[11] Patent Number: 5,986,379
[45] Date of Patent: Nov. 16, 1999

[54] MOTOR WITH EXTERNAL ROTOR

[75] Inventors: Robert K. Hollenbeck; David M. Erdman, both of Fort Wayne; Dennis P. Bobay; James E. Grimm, both of Ossian; Harold B. Harms; David T. Molnar, both of Fort Wayne, all of Ind.

[73] Assignee: General Electric Company, Schenectady, N.Y.

[21] Appl. No.: 08/761,728

[22] Filed: Dec. 5, 1996

[51] Int. Cl.⁶ .................................................. H02K 1/12
[52] U.S. Cl. .......................... 310/257; 310/49 R; 310/44; 310/216; 310/68 B; 310/71
[58] Field of Search ................. 310/49 R, 257, 310/68 B, 90, 91, 44, 216

[56] References Cited

U.S. PATENT DOCUMENTS

| | | | |
|---|---|---|---|
| 2,427,947 | 9/1947 | Koch | 308/166 |
| 2,500,592 | 3/1950 | Whiteley | 308/72 |
| 2,571,672 | 10/1951 | Bradley | 308/132 |
| 2,839,697 | 6/1958 | Pierce et al. | 310/93 |
| 2,857,534 | 10/1958 | Beach | 310/74 |
| 3,127,092 | 3/1964 | Shenberger | 310/91 |
| 3,305,740 | 2/1967 | Shano | 310/42 |
| 3,336,092 | 8/1967 | Dochterman | 308/132 |
| 3,427,485 | 2/1969 | Dotto | 310/164 |
| 3,441,763 | 4/1969 | Patrignani | 310/179 |
| 3,459,982 | 8/1969 | Cartier | 310/164 |
| 3,493,800 | 2/1970 | Barrett | 310/168 |
| 3,496,393 | 2/1970 | Reifman et al. | 310/49 |
| 3,501,661 | 3/1970 | Heinzen et al. | 310/194 |
| 3,508,091 | 4/1970 | Kavanaugh | 310/49 |
| 3,541,363 | 11/1970 | Vettermann et al. | 310/49 |
| 3,549,925 | 12/1970 | Johnson | 310/168 |
| 3,551,711 | 12/1970 | Davis | 310/43 |
| 3,553,510 | 1/1971 | Howey | 310/156 |
| 3,603,825 | 9/1971 | Sheridan et al. | 310/194 |
| 3,675,060 | 7/1972 | Hills | 310/172 |
| 3,790,834 | 2/1974 | Tanaka | 310/162 |
| 3,826,939 | 7/1974 | Mori et al. | 310/154 |
| 3,881,243 | 5/1975 | Bannon | 29/598 |

(List continued on next page.)

FOREIGN PATENT DOCUMENTS

| | | | |
|---|---|---|---|
| 0 299 512 | 7/1988 | European Pat. Off. | H02K 23/04 |
| 0 591 724 | 9/1993 | European Pat. Off. | H02K 21/22 |
| 2 570 228 | 9/1984 | France | H02K 1/06 |
| 213 797 | 6/1941 | Switzerland . | |

OTHER PUBLICATIONS

GE SME44 Motor Assembly, admitted prior art, see description and drawings attached.
Translation of Switzerland Patent No. 213 797 published Jun. 3, 1941, pp. 1–4.
Translation of EPO Patent No. 0 591 724 dated Sep. 15, 1993, pp. 1–10.
"AMP Product Guide" (AMP 500), AMP Incorporated, 1991, Harrisburg, PA; pp. 3268 and 3269.
"Surface Mount & Through Hole Interconnection & Assembly Solutions", Zierick Manufacturing Corporation; Mount Kisco, NY, pp. 38.

*Primary Examiner*—Nestor Ramirez
*Assistant Examiner*—B Mullins
*Attorney, Agent, or Firm*—Senniger, Powers, Leavitt & Roedel; Wayne O. Traynham

[57] ABSTRACT

A motor having an external rotor, or "inside out motor" has a split C arrangement of ferromagnetic members which function as the poles of the electromagnet in the motor. The ferromagnetic members are generally C-shaped and mounted on opposite end caps of the motor. The ferromagnetic members on the opposing end caps are angularly offset from each other. The ferromagnetic members on each end cap are also spaced apart from each other, and receive a portion of the motor windings within them. The motor is constructed for assembly using few or no separate fastening devices to secure the components together. In one embodiment, a bearing core serves as the base on which all parts are assembled.

66 Claims, 11 Drawing Sheets

U.S. PATENT DOCUMENTS

| | | | |
|---|---|---|---|
| 3,997,806 | 12/1976 | Noto et al. | 310/268 |
| 4,032,807 | 6/1977 | Richter | 310/178 |
| 4,059,780 | 11/1977 | Mazuir | 310/164 |
| 4,074,157 | 2/1978 | Lace | 310/67 R |
| 4,105,907 | 8/1978 | Hagenlocher et al. | 310/232 |
| 4,114,056 | 9/1978 | Nimura | 310/42 |
| 4,204,810 | 5/1980 | Vogel | 417/244 |
| 4,217,508 | 8/1980 | Uzuka | 310/46 |
| 4,255,681 | 3/1981 | Gerber | 310/162 |
| 4,259,603 | 3/1981 | Uchiyama et al. | 310/68 |
| 4,260,925 | 4/1981 | Barrett | 310/216 |
| 4,286,186 | 8/1981 | Hagenlocher et al. | 310/89 |
| 4,329,606 | 5/1982 | Montagu | 310/71 |
| 4,355,249 | 10/1982 | Kenwell | 310/49 |
| 4,381,465 | 4/1983 | Renkl et al. | 310/49 R |
| 4,385,249 | 5/1983 | Fukushima | 310/68 R |
| 4,433,260 | 2/1984 | Weisbord | 310/156 |
| 4,446,392 | 5/1984 | Jaeschke | 310/105 |
| 4,476,449 | 10/1984 | Gray et al. | 335/138 |
| 4,501,984 | 2/1985 | Mishima | 310/261 |
| 4,543,208 | 9/1985 | Horie et al. | 252/62.5 |
| 4,554,491 | 11/1985 | Plunkett | 310/68 R |
| 4,588,915 | 5/1986 | Gold et al. | 310/194 |
| 4,598,220 | 7/1986 | Stone | 310/90 |
| 4,601,765 | 7/1986 | Soileau et al. | 148/104 |
| 4,604,538 | 8/1986 | Merrill et al. | 310/68 D |
| 4,623,809 | 11/1986 | Westley | 310/49 R |
| 4,656,381 | 4/1987 | Komatsu | 310/257 |
| 4,713,567 | 12/1987 | Fey et al. | 310/105 |
| 4,724,347 | 2/1988 | Reinhardt et al. | 310/68 |
| 4,728,833 | 3/1988 | Shiraki et al. | 310/68 R |
| 4,733,114 | 3/1988 | Suyama et al. | 310/49 R |
| 4,761,576 | 8/1988 | Savage | 310/51 |
| 4,783,608 | 11/1988 | Gruber et al. | 310/90 |
| 4,794,292 | 12/1988 | Torisawa | 310/257 |
| 4,823,034 | 4/1989 | Wrobel | 310/67 R |
| 4,841,190 | 6/1989 | Matsishita et al. | 310/257 |
| 4,864,176 | 9/1989 | Miller et al. | 310/194 |
| 4,891,567 | 1/1990 | Fujitani et al. | 318/254 |
| 4,895,495 | 1/1990 | Arai | 417/360 |
| 4,899,075 | 2/1990 | Hasebe | 310/257 |
| 4,924,124 | 5/1990 | Kato | 310/43 |
| 4,926,540 | 5/1990 | Kato | 29/596 |
| 4,952,828 | 8/1990 | Yu-fang et al. | 310/68 D |
| 4,961,016 | 10/1990 | Peng et al. | 310/62 |
| 4,972,109 | 11/1990 | Kakizaki et al. | 310/49 A |
| 4,987,331 | 1/1991 | Horng | 310/254 |
| 4,990,806 | 2/1991 | Kikuchi et al. | 310/49 A |
| 5,004,577 | 4/1991 | Ward | 264/112 |
| 5,016,340 | 5/1991 | Kato | 29/598 |
| 5,081,383 | 1/1992 | Kusumoto et al. | 310/59 |
| 5,093,599 | 3/1992 | Horng | 310/254 |
| 5,095,612 | 3/1992 | McAvena | 310/88 |
| 5,097,169 | 3/1992 | Fukushima | 310/263 |
| 5,121,017 | 6/1992 | Yamamoto et al. | 310/49 R |
| 5,121,021 | 6/1992 | Ward | 310/154 |
| 5,132,603 | 7/1992 | Yoshimoto | 318/696 |
| 5,147,601 | 9/1992 | Ohtsuka et al. | 419/25 |
| 5,170,082 | 12/1992 | Nakagawa et al. | 310/45 |
| 5,177,391 | 1/1993 | Kusase | 310/263 |
| 5,237,230 | 8/1993 | Sugiyama et al. | 310/113 |
| 5,245,236 | 9/1993 | Horng | 310/67 |
| 5,270,604 | 12/1993 | Sandel et al. | 310/263 |
| 5,277,500 | 1/1994 | Keck | 384/204 |
| 5,284,495 | 2/1994 | Wendel et al. | 310/257 |
| 5,291,084 | 3/1994 | Shiotsuki et al. | 310/49 R |
| 5,298,820 | 3/1994 | Lee et al. | 310/40 |
| 5,325,003 | 6/1994 | Saval et al. | 310/43 |
| 5,327,037 | 7/1994 | Rasmussen | 310/232 |
| 5,329,199 | 7/1994 | Yockey et al. | 310/263 |
| 5,331,237 | 7/1994 | Ichimura | 310/44 |
| 5,361,011 | 11/1994 | York | 310/194 |
| 5,369,324 | 11/1994 | Saether | 310/49 R |
| 5,382,862 | 1/1995 | Ward et al. | 310/263 |
| 5,519,933 | 5/1996 | Sakashita et al. | 310/42 |
| 5,539,263 | 7/1996 | Lee | 310/67 |
| 5,574,321 | 11/1996 | Baker | 310/67 |

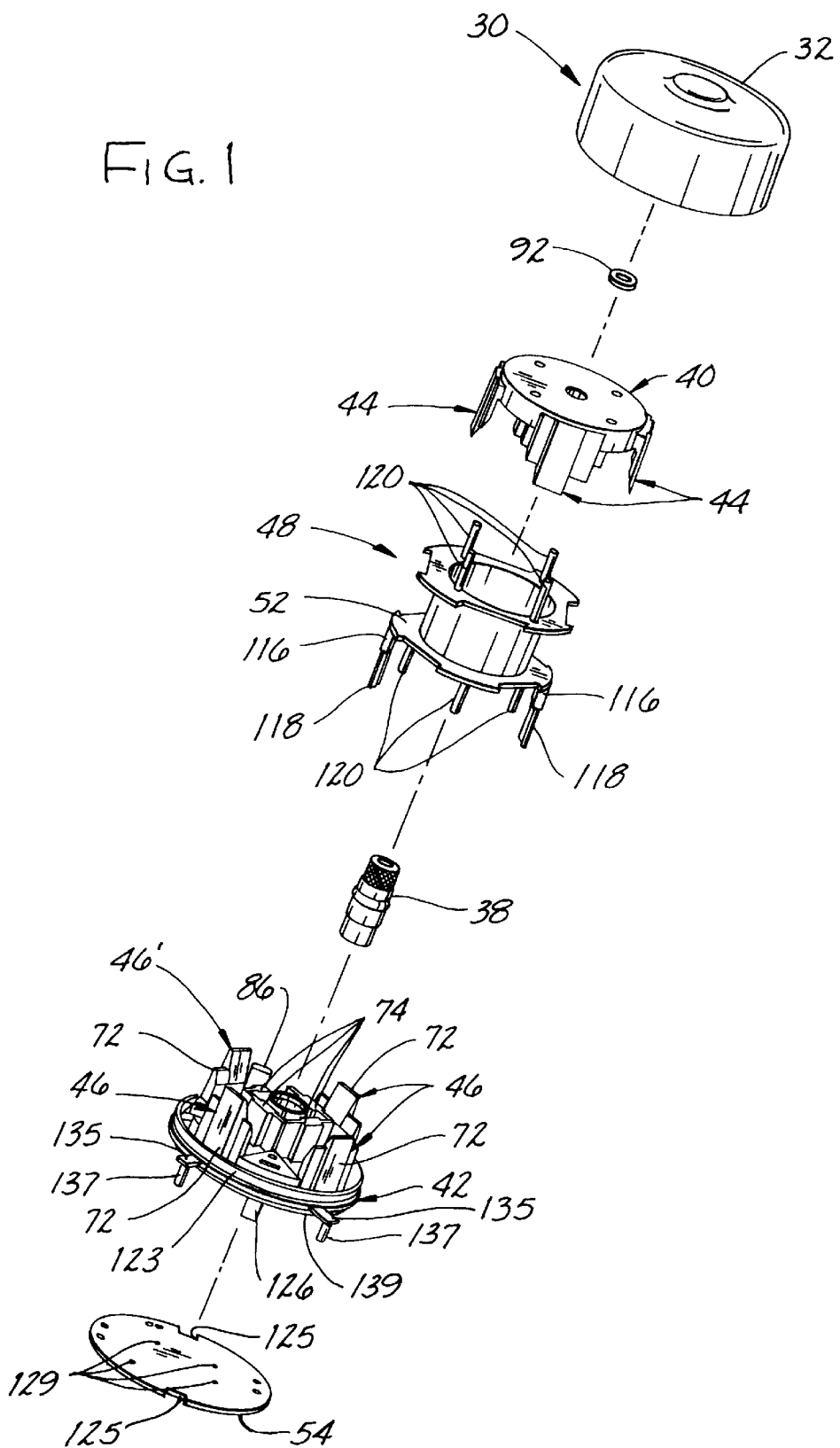

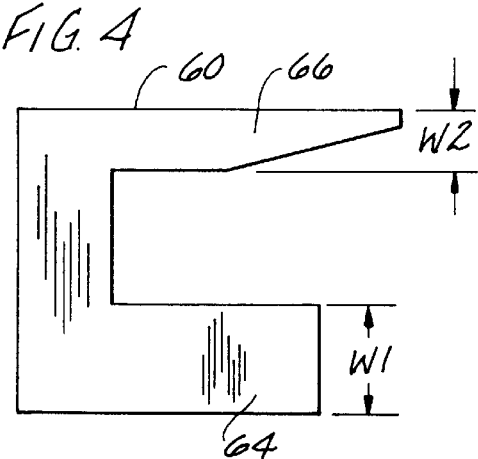
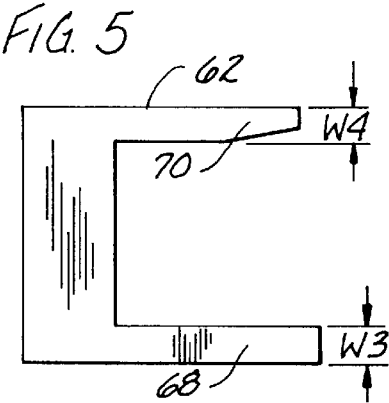
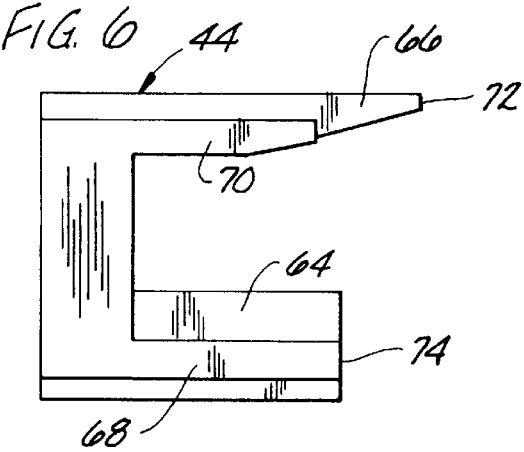
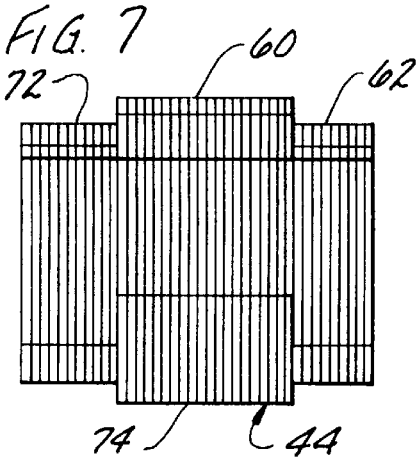
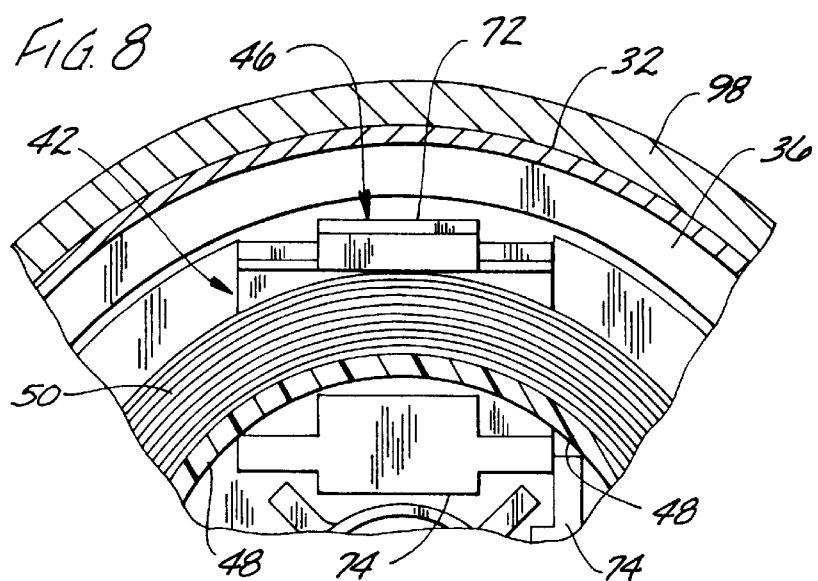

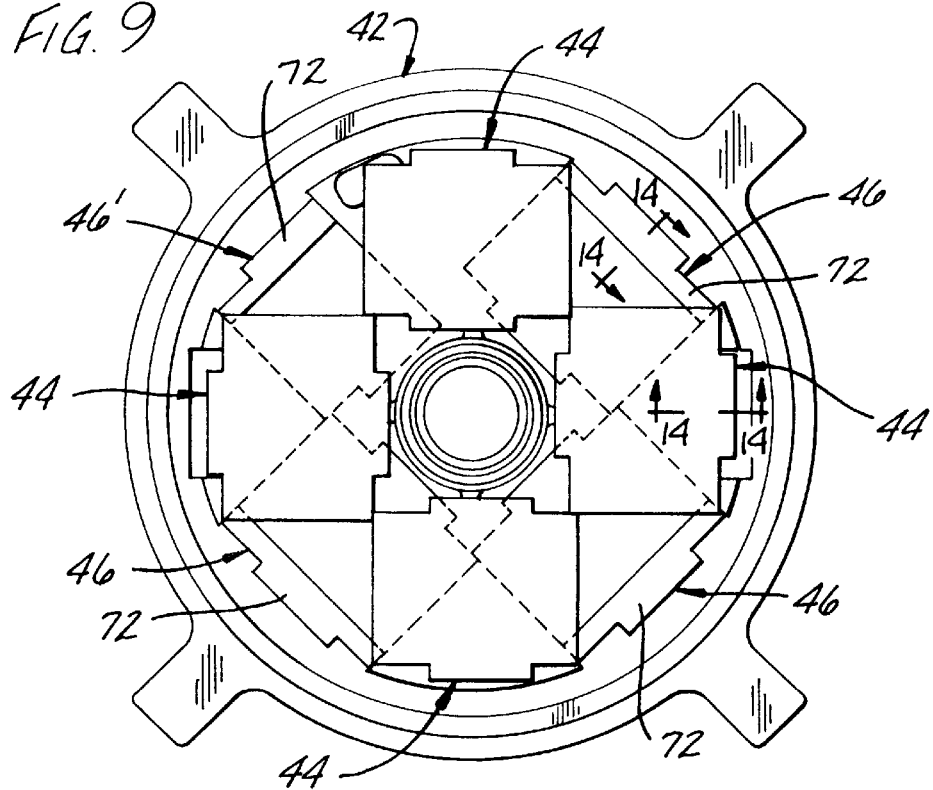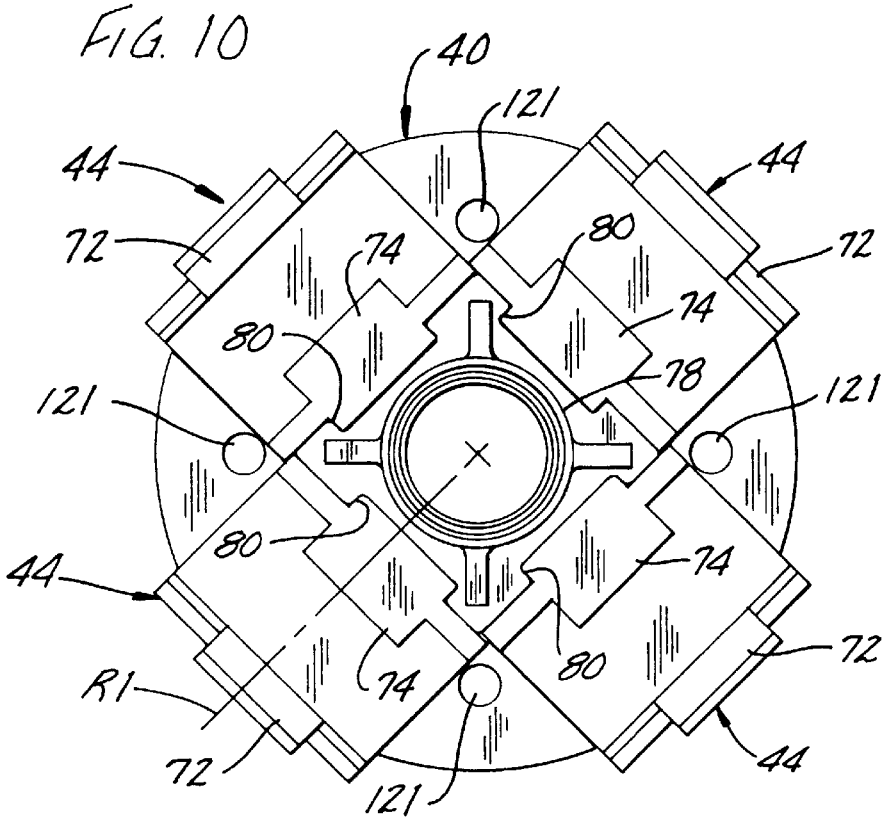

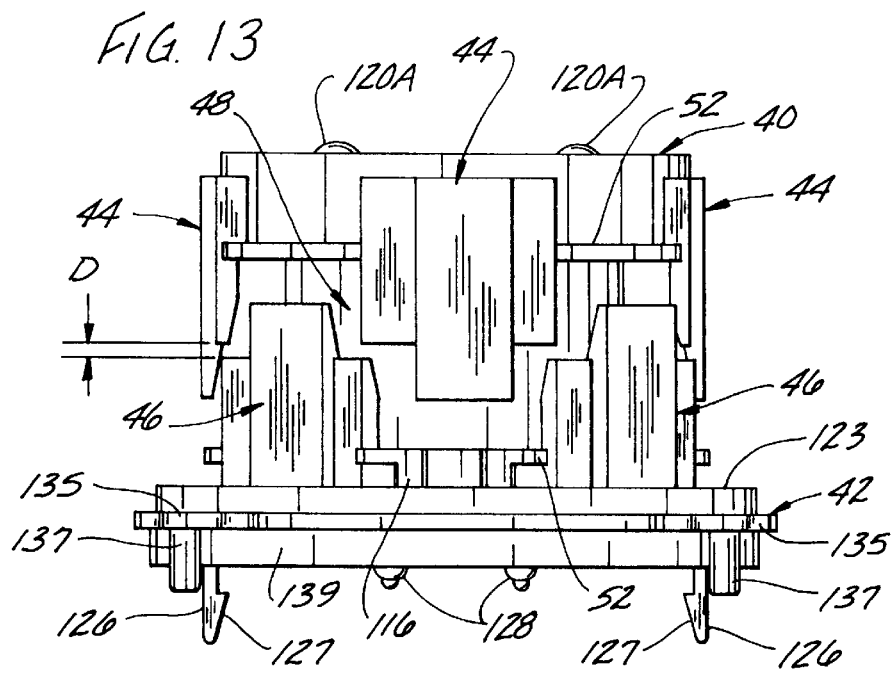
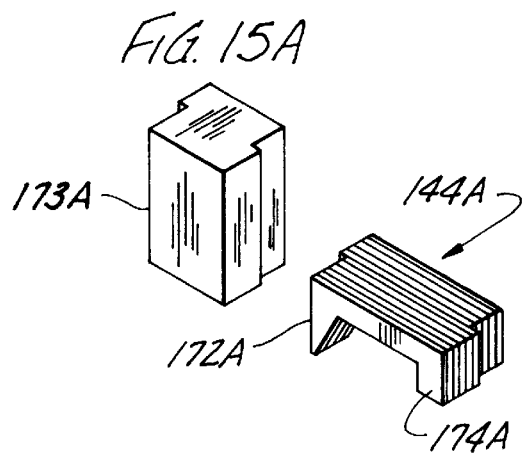
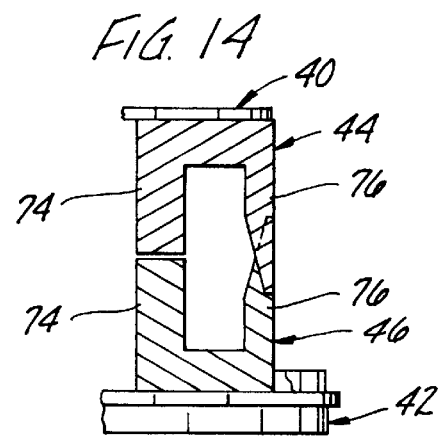
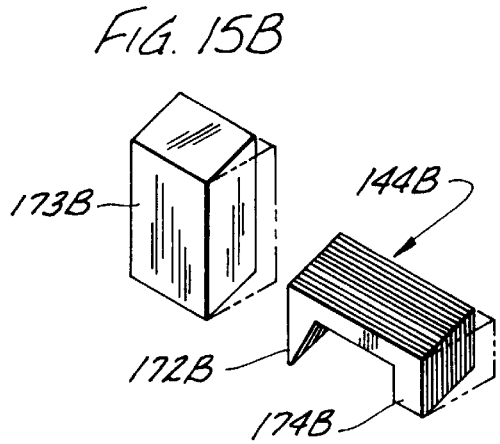
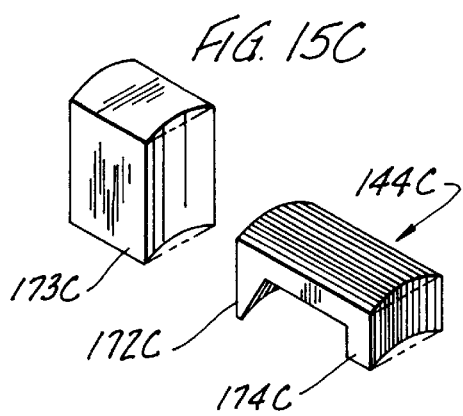

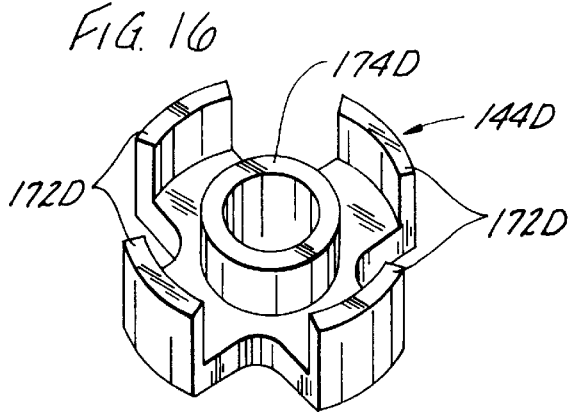
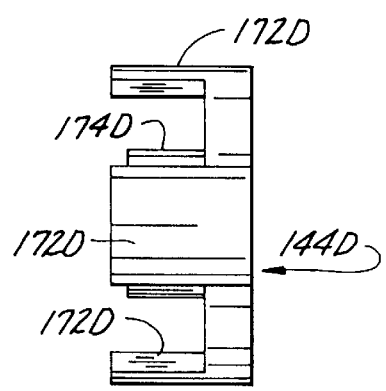
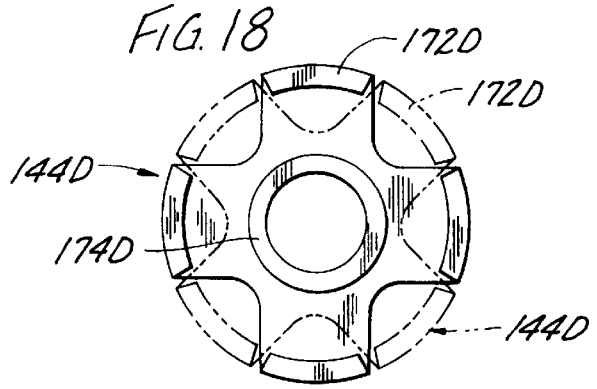
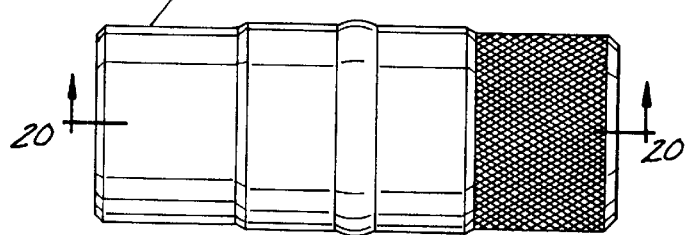
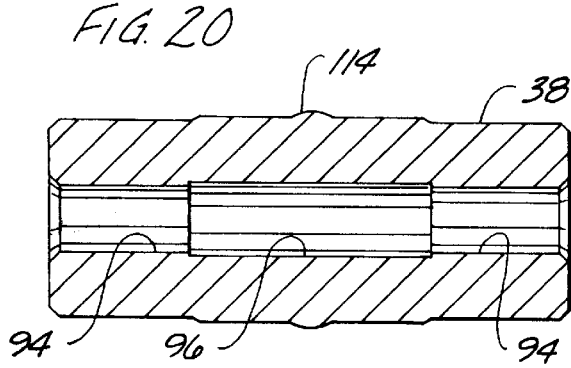
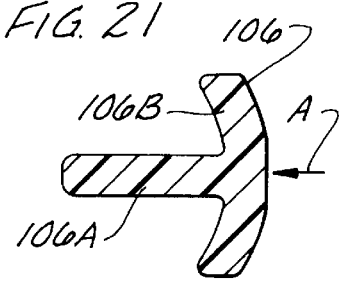

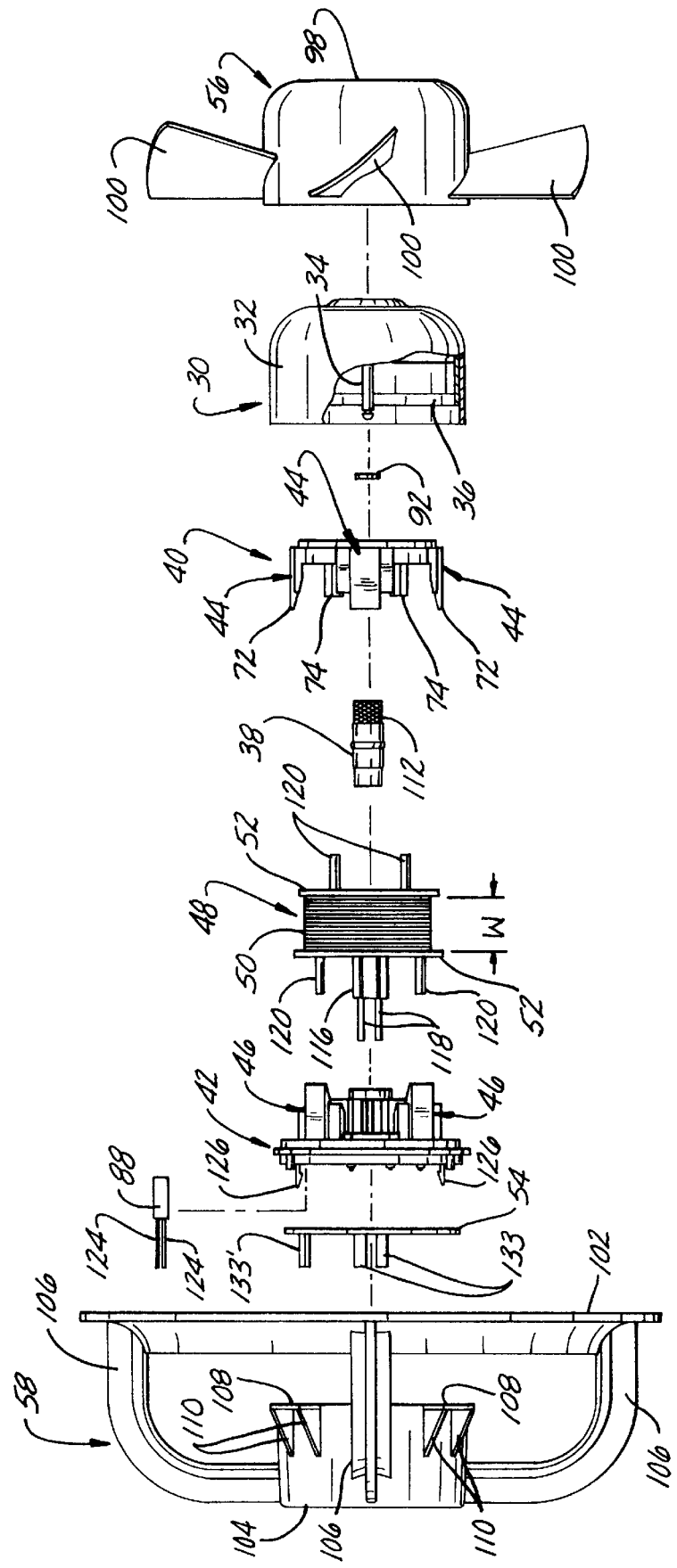

MOTOR WITH EXTERNAL ROTOR

BACKGROUND OF THE INVENTION

This invention relates generally to electric motors and more specifically to a motor with an external rotor and a method for assembling the motor.

An motor with an external rotor or an "inside out motor", of the type to which the present invention generally relates has permanent magnets mounted on an inner surface of a cup-shaped rotor bell. The stator is located inside the permanent magnets on the rotor bell. The stator is shaped to receive a bearing for rotatably mounting a rotor shaft through the stator so that the shaft and rotor bell may rotate relative to the stator as a result of the magnetic interaction of the permanent magnets and the magnetic fields created by energizing windings of the stator. Presently, these motors are electronically commutated and have a sensor for detecting the position of the magnetic poles of the rotor to control the commutation of the motor.

Typically, only one or two windings are wound on a bobbin of an inside out motor. Metal is provided around the bobbin, between the permanent magnets and the windings, to conduct the magnetic flux generated by the energized windings. Opposite ends of a plate are bent down so that the bent down ends may extend across the windings on diametrically opposite sides of the bobbin. The plate also has a central opening and a ring extending from the opening which is received into a central opening of the bobbin. Two substantially identical plates are mounted on axially opposite ends of the bobbin, and are angularly offset so that their bent down ends extend over different parts of the windings.

SUMMARY OF THE INVENTION

Among the several objects and features of the present invention may be noted the provision of an inside out motor which is easy and cost-efficient to manufacture; the provision of such a motor which is of simplified construction; the provision of such a motor which produces little line interference; the provision of such a motor which encloses metal parts in electrically insulating material; the provision of such a motor which has reduced iron losses in the stator; the provision of such a motor which is lubricated for life without a separate reservoir of lubricant within the motor; and the provision of such a motor which automatically aligns the rotor shaft.

Further among the several objects and features of the present invention may be noted the provision of a method for assembling an inside out motor which may be carried out with no fasteners separate from the components of the motor; the provision of such a method which automatically produces electrical connection of the windings to a circuit board upon assembly of the motor components; the provision of such a method which has a fewer number of steps; the provision of such a method which allows all components of the motor to be mounted on a single core.

Generally, an inside out motor of the present invention comprises a rotor including a concave member, a shaft mounted on the concave member and magnet means mounted on an interior surface of the concave member. The magnet means is spaced from the shaft and extends circumferentially on the concave member around the longitudinal axis of the shaft. Bearing means receiving the shaft for rotatably mounting the rotor also mounts a stator assembly. A bobbin of the stator assembly mounted generally coaxially with the rotor shaft has an interior diameter and an exterior diameter. A winding wound on the bobbin extends around the axis of the rotor shaft, and has a width in a direction parallel to the lengthwise extension of the rotor shaft. A ferromagnetic member has a radially outer leg extending between the winding and the magnet generally from a first axial end of the bobbin toward an opposite second axial end a distance less than the width of the winding.

In another aspect of the invention, a method for assembling an inside out motor generally includes the steps of molding a first end cap around pre-formed ferromagnetic members whereby the ferromagnetic members are secured to the first end cap, and molding a second end cap around pre-formed ferromagnetic members whereby the ferromagnetic members are secured to the second end cap. A bearing is connected to one of the first end and second caps. A bobbin wound with at least one winding of wire has the first and second end caps attached to its on axially opposite ends to form a stator assembly. Each ferromagnetic member receives a portion of the bobbin and winding therein, and the bearing is received through the bobbin and into a central opening of the other of the first and second end caps. A rotor mounted on the stator assembly comprises a concave member and a shaft mounted on the interior of the concave member. The shaft is received in the bearing and the concave member of the rotor at least partially receives the stator assembly therein.

In still another aspect of the present invention, a method for assembling an inside out motor generally includes providing a bearing system including the steps of providing a generally tubular bearing core, seating first and second bearings within the bearing core. The bearings are adapted to receive a rotor shaft therethrough. A stator is mounted on an exterior surface of the bearing core, and the rotor shaft is inserted through the bearing core, with the shaft being received in the bearings so that the shaft is supported by the bearing core. An end closure is mounted on the bearing core whereby the bearing core forms the structural base of the motor.

Other objects and features of the invention will be in part apparent and in part pointed out hereinafter.

BRIEF DESCRIPTION OF THE DRAWINGS

FIG. 1 is an exploded perspective view of an inside out motor of the present invention;

FIG. 4 is a plan view of a first lamination used to form a ferromagnetic member;

FIG. 5 is a plan view of a second lamination used to form the ferromagnetic member;

FIG. 6 is a front elevational view of the ferromagnetic member;

FIG. 7 is a right side elevational view of the ferromagnetic member;

FIG. 8 is an enlarged, fragmentary vertical section taken through the motor of FIG. 3 just to the right of the upper ferromagnetic member illustrated and looking to the left;

FIG. 9 is a schematic right end view of the motor of FIG. 3 with a fan, rotor bell, shroud, end cap, bobbin and windings of the motor removed to illustrate the relative angular position of ferromagnetic members in the motor;

FIG. 10 is a plan view of a first end cap showing its axially inner side including the ferromagnetic members mounted thereon;

FIG. 11 is a plan view of a second end cap showing its axially inner side including the ferromagnetic members mounted thereon;

FIG. 12 is a plan view of the second end cap showing its axially outer side;

FIG. 13 is a side elevational view of the first and second end caps assembled with a bobbin of the motor and showing the spacing of radially outer legs of adjacent ferromagnetic members;

FIG. 14 is a fragmentary, schematic section produced by taking sections indicated by lines 14—14 through adjacent ferromagnetic members of FIG. 9 and rotating the views into the same plane to illustrate the reduced circumferential alignment of the radially outer legs of adjacent ferromagnetic members;

FIGS. 15A–15C are schematic perspective views showing three different forms and ferromagnetic members shaped by the respective forms;

FIG. 16 is a perspective view of a molded ferromagnetic member;

FIG. 17 is a side elevational view of the molded ferromagnetic member;

FIG. 18 is a plan view of the axially inner side of the molded ferromagnetic member;

FIG. 19 is a side elevational view of a sleeve bearing;

FIG. 20 is a longitudinal section of the sleeve bearing;

FIG. 21 is a cross section of an arm of the shroud taken on line 21—21 of FIG. 2;

FIG. 22 is an exploded elevational view of the motor including a fan and the shroud, and illustrating the assembly of the motor;

Corresponding reference characters indicate corresponding parts throughout the several views of the drawings.

DETAILED DESCRIPTION OF THE PREFERRED EMBODIMENTS

Figure 3:
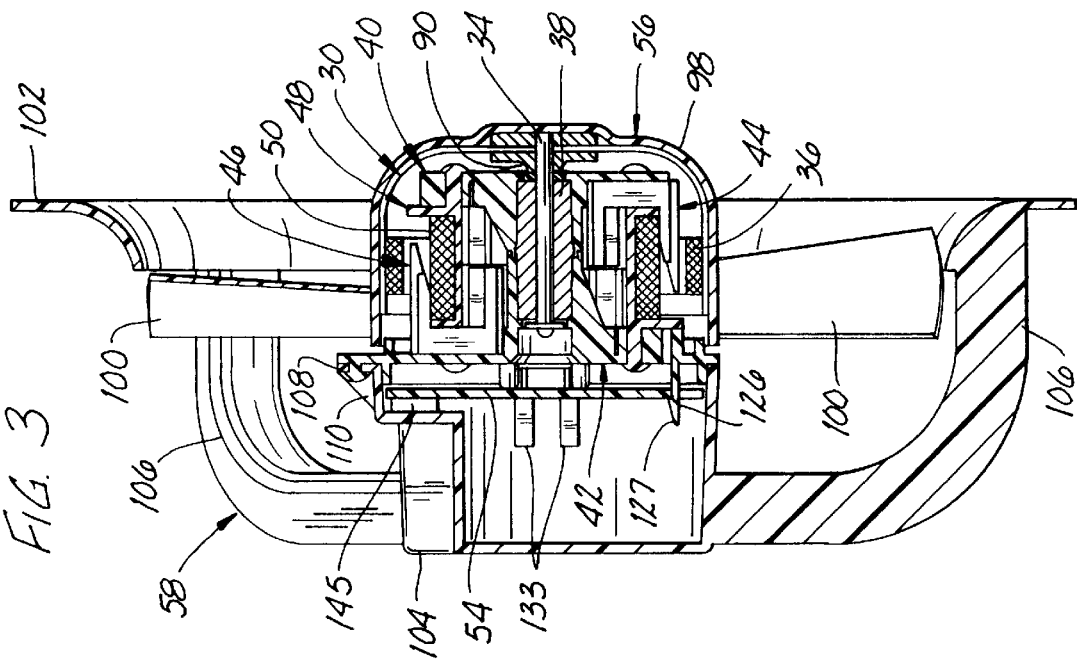
FIG. 3 is a sectional view taken on the line 3-3 of FIG. 2.
Figure 2:
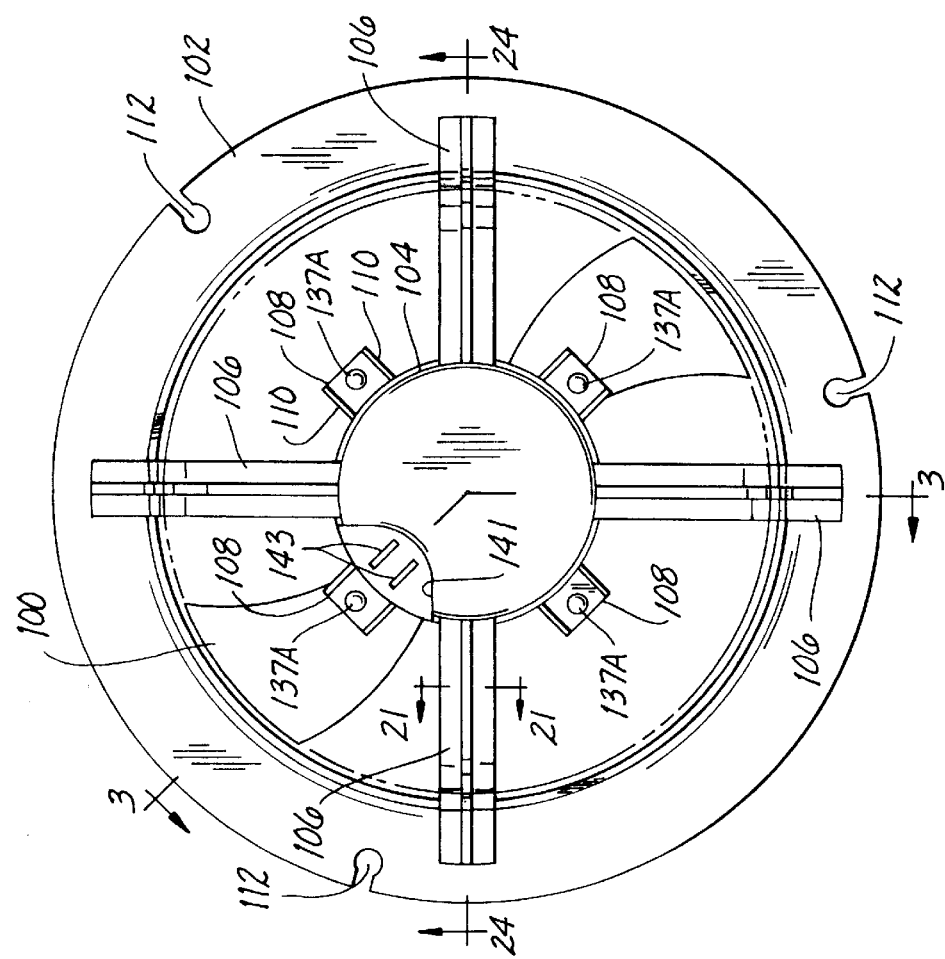
FIG. 2 is a front elevational view of a shroud mounting the inside out motor.

Referring now to the drawings, and in particular to FIGS. 1–3, an inside out motor constructed according to the principles of the present invention is shown to include a rotor, generally indicated at 30, comprising a bell 32 (broadly, "concave member"), a shaft 34 mounted on the interior of the bell and permanent magnet strip 36 having four pole pairs extending circumferentially around an the interior of the bell. The shaft 34 is received through a sleeve bearing 38 which mounts on its exterior first and second end caps (indicated generally at 40 and 42, respectively). The first end cap has four ferromagnetic members, generally indicated at 44, and the second end cap has four ferromagnetic members, generally indicated at 46. The ferromagnetic members are generally C-shaped and spaced at 90° intervals around the circumference of the first and second end caps 40, 42. The disposition of the ferromagnetic members 44, 46 in spaced part positions may be referred to as a "split C" arrangement. There may be a greater or fewer number of ferromagnetic members 44, 46 depending on the number of magnetic poles desired for the motor. An eight pole motor is illustrated in a preferred embodiment, particularly for use as an evaporator fan.

A bobbin 48 holds two windings (designated collectively by reference numeral 50) wound on the bobbin and extending around the axis of the rotor shaft 34 in a coil. The windings 50 are not illustrated in FIG. 1 so that the construction of the bobbin 48 may be seen. A single winding or more than two windings may be used without departing from the scope of the present invention. The windings 50 have a width W in a direction parallel to the axis of the rotor shaft 34 which is substantially equal to the axial dimension of the bobbin 48 between opposite end flanges 52 (see FIG. 22). In the preferred embodiments, the motor is electronically commutated and has a printed circuit board 54 mounted on the second end cap 42 for controlling engergization of the windings 50. The control devices mounted on the circuit board 54 have not been illustrated in the drawings for clarity. As an example and not by way of limitation, the control circuitry may be a CAPACITIVELY POWERED MOTOR AND CONSTANT SPEED CONTROL as described in co-assigned, co-pending U.S. patent application Ser. No. 08/761,748, filed Dec. 5, 1996, the entire disclosure of which is incorporated herein by reference. As described more fully below, the motor is fitted with a fan and mounted on a shroud (designated generally by reference numerals 56 and 58, respectively) for use as an evaporator or condenser fan. The motor may be used in other applications without departing from the scope of the present invention.

The ferromagnetic members 44, 46 of the present invention are formed by stacking laminations stamped from sheet metal and stacked together. In the preferred embodiment, the ferromagnetic members 44, 46 are formed from first laminations 60 (FIG. 4) and second laminations 62 (FIG. 5) which are generally C-shaped. The first and second laminations 60, 62 are shaped and arranged in the stack defining the ferromagnetic member (e.g., ferromagnetic member 44 shown in FIGS. 6 and 7) to facilitate starting the motor in the desired direction, and to maximize conductance of magnetic flux while minimizing iron losses and inductance between circumferentially adjacent ferromagnetic members 44, 46. As shown in FIG. 4, the first lamination 60 has an inner leg 64 having a width W1, and a thinner outer leg 66 (width W2) which is tapered at its free end. References to "inner" and "outer" are made with respect to the relative radial locations of the parts of the ferromagnetic members 44, 46 in the assembled motor relative to the longitudinal axis of the rotor shaft 34. The outer leg 66 is longer than the inner leg 64. Referring now to FIG. 5, the second lamination 62 is shown to have an inner leg 68 and an outer leg 70 which is tapered at its free end. The inner leg 68 is slightly longer than the outer leg, and is the same length as the inner leg 64 of the first lamination 60. However, the width W3 of the inner leg 68 of the second lamination 62 is substantially less than the width of the inner leg 64 of the first lamination 60. Similarly, the width W4 of the outer leg 70 of the second lamination 62 is less than the width W2 of the outer leg of the first lamination 60. The first and second laminations 60, 62 have substantially the same thickness. Thus, it may be seen that the first laminations 60 include more metal for carrying additional flux between the windings 50 and the permanent magnet strip 36.

One of the ferromagnetic members 44 formed by stacking together the first and second laminations 60, 62 is shown in FIGS. 6 and 7. In the preferred embodiment, all of the ferromagnetic members 44, 46 except for one (designated as 46') are substantially similar in construction. The first and second laminations are stacked so that the first laminations 60 are located in a central portion of the ferromagnetic member 44 and second laminations 62 are located in side portions on opposite sides of the central portion. The ferromagnetic member 44 is made asymmetrical by stacking more of the second laminations 62 on one side of the central portion (e.g., on the left side of the central portion of the ferromagnetic member 44 as viewed in FIG. 7) than the other. The asymmetry of the ferromagnetic member 44 will cause the rotor 30 to stop so that the poles of the permanent magnet strip 36 on the rotor bell 32 are not positioned half way between adjacent poles of the stator.

As shown in FIG. 6, the outer legs 66 of the first laminations 60 are generally aligned with the outer legs 70 of the second laminations 62 to form an outer leg 72 of the ferromagnetic member 44. The inner legs 64 of the first laminations 60 are substantially aligned with the inner legs 68 of the second laminations 62 to form an inner leg 74 of the ferromagnetic member 44. The first and second laminations 60, 62 are secured together in the stack in a suitable manner such as by welding. Other methods for securing the laminations together which are envisioned include forming interlocks (not shown) on the laminations which will interconnect the laminations in the stack.

In the assembled motor, the ferromagnetic members 44, 46 receive portions of the windings 50 between their outer and inner legs 72, 74. The C-shape of the ferromagnetic members 44, 46 follows a segment of the flux paths for the magnetic fields generated by the windings 50. As may be seen in FIG. 3, the central portions of the outer legs 72 of the ferromagnetic members 44, 46 extend between the permanent magnet and the windings 50. The outer legs 72 of the ferromagnetic members 44 mounted on the first end cap 40 extend in the opposite axial direction from the outer legs of the ferromagnetic members 46 on the second end cap 42. The central portion of the outer leg 72 of each ferromagnetic member 44, 46 extends further than the side portions from one axial end of the bobbin 48 toward the opposite end. The central portion of the outer leg 72 extends axially across substantially the full width of the permanent magnet mounted on the rotor bell 32, but does not extend across the full width W of the windings 50. However, it is envisioned that the central portion of the outer leg 72 could be made to extend across the full width W of the windings 50, or even beyond the opposite end of the bobbin 48. Such designs would still fall within the scope of the present invention.

As shown in FIG. 8, the difference in widths W1, W3 between the inner legs 64, 68 of the first laminations 60 and second laminations 62 permits the ferromagnetic members 44, 46 to roughly approximate the circular shape of the inner diameter of the bobbin 48 using only two different kinds of laminations. Similarly, the difference in widths W2, W4 between the outer legs 66, 70 of the first laminations 60 and second laminations 62 permits the ferromagnetic members 44, 46 to roughly approximate the circular shape of the interior surface of the rotor bell 32. The individual laminations 60, 62 of the ferromagnetic members 44, 46 are not shown in FIG. 8 and other figures for clarity of the drawings. The central portion of the outer leg 72 of the ferromagnetic member 46 shown in FIG. 8 protrudes radially outwardly from the side portions because of the greater width W2 of the outer legs 66 of the first laminations 60. The stepped configuration of the outer leg 72 reduces the air gap between the permanent magnet strip 36 and the ferromagnetic member 46 in the central portion of the ferromagnetic member. If the outer legs 66, 70 of the laminations 60, 62 were all of the same width and stacked in registration with each other, the air gap in the center of the ferromagnetic member 46 would be substantially larger than on the side portions (not shown). Moreover, the width W4 of the outer legs 70 of the second laminations 62 are limited because they must not engage the permanent magnet strip 36.

In the same way the stepped configuration of the inner leg 74 of the ferromagnetic member 46 permits the inner leg to approximately conform to the curvature of the inside diameter of the bobbin 48. The greater width of the central portion of the inner leg 74 positions the metal of the inner leg where there is the most space on the inner diameter of the bobbin 48. The lesser width of the inner leg side portions also provides room for the adjacent ferromagnetic member 46. As may be seen in FIGS. 8, 10 and 11, the ferromagnetic members 44, 46 abut each other at the ends of their inner legs 74. Wider inner legs 74 would not fit in the existing arrangements of the ferromagnetic members 44, 46. By conforming the shape of the inner leg 74 to the curvature of the bobbin 48, the inside diameter of the bobbin can be made smaller. The smaller the inside diameter of the bobbin 48, the more wire which may be included in the windings 50. However, the presence of the additional metal in the central portion allows the ferromagnetic member 46 to have sufficient flux carrying capacity on its inner leg 74.

The orientation of the first and second laminations 60, 62 in the stack making up the ferromagnetic members 44, 46 helps to reduce iron losses caused in part by eddy currents within the ferromagnetic members. The magnetic fields tend to induce electric eddy currents within the ferromagnetic members 44, 46 along their lengths. The first and second laminations 60, 62 are oriented in planes parallel to the longitudinal axis of the rotor shaft 34 and perpendicular to the direction of the eddy currents. Thus, the eddy currents must flow from lamination to lamination. Each lamination 60, 62 is provided with an oxide layer providing resistance to the passage of the current from one lamination to the next. In contrast, each lamination 60, 62 in the ferromagnetic members 44, 46 lies in a plane which is parallel to the flux paths of the magnetic fields generated by the windings 50. Therefore, the ferromagnetic members 44, 46 facilitate magnetic flux while inhibiting eddy currents.

In the preferred embodiment, the first end cap 40 is made of polymeric material and formed by injection molding around four ferromagnetic members 44. The first end cap 40 has a central tubular portion 78 which receives an end of the sleeve bearing 38. As shown in FIG. 10, the four ferromagnetic members 44 are located around the central tubular portion with the central portions of the inner legs 74 of the ferromagnetic members received in corresponding notches 80. The notches 80 are not located symmetrically around the first end cap 40. Each notch 80 is offset to one side of a radial line (e.g., radial line R1) extending from the center of the first end cap 40 and passing perpendicularly through the notch. As a result, the ferromagnetic members 44 mounted on the first end cap 40 are not symmetrical about any radial line extending from the center of the cap. As assembled in the motor, the ferromagnetic members 44 are asymmetric about any plane which includes the longitudinal axis of the rotor shaft 34. As a result, the air gap between the outer legs 72 of the ferromagnetic members 44 on the first end cap 40 and the permanent magnet strip 36 is asymmetrical. Accordingly, a cogging torque is produced in the direction it is desired for the rotor 30 to turn.

Figures 11, 12:
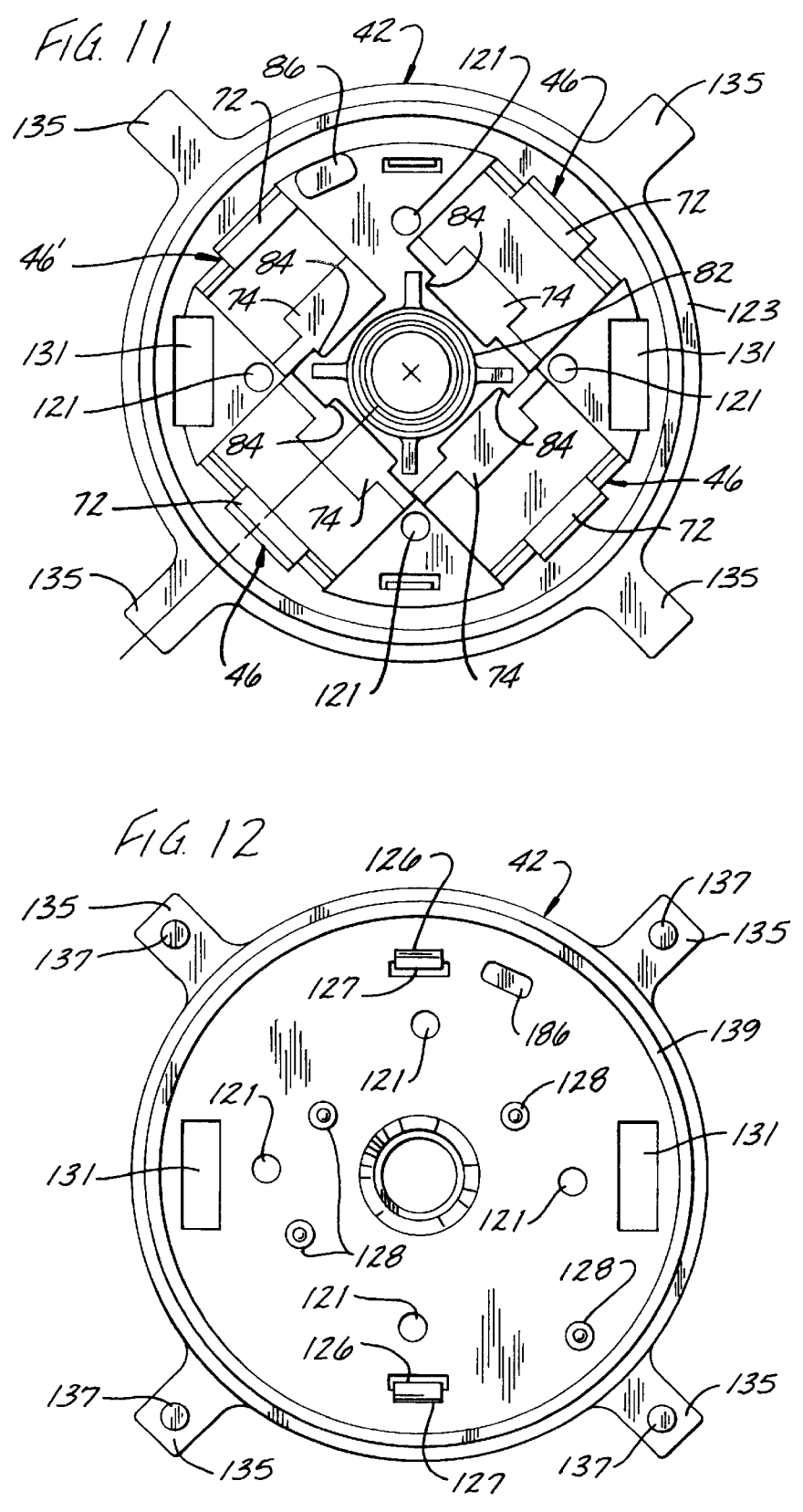

The second end cap 42 is also preferably formed of a polymeric material which is injection molded around another four of the ferromagnetic members 46. The second end cap 42 includes a central tubular portion 82 which receives the opposite end of the sleeve bearing 38 for mounting the second end cap on the sleeve bearing. As shown in FIG. 11, the four ferromagnetic members 46 are located around the central tubular portion with the central portions of the inner legs 74 of the ferromagnetic members received in corresponding notches 84. The notches are located asymmetrically around the second end cap 42 in the same manner and for the same reasons as the notches of the first end cap 40. It will be noted that one of the ferromagnetic members 46' has no second laminations 62 on one side of the central portion. The absence of these laminations provides a space for a pocket 86, formed as one piece with the second end cap 42, which contains a rotor position sensor such as a Hall device unit 88 (FIG. 22) for detecting the position of the rotor 30.

The arrangement of all eight ferromagnetic members 44, 46, as seen in a right end view of the motor, is shown schematically in FIG. 9. The ferromagnetic members 44 mounted on the first end cap 40 are offset 45 degrees from the ferromagnetic members 46 on the second end cap 42. However, portions of the ferromagnetic members 44 on the first end cap 40 are in axial alignment with (i.e., appear to overlap when viewed as shown in FIG. 9) the ferromagnetic members 46 mounted on the second end cap 42. The only overlap occurs between the shorter side portions outer legs 72 of the ferromagnetic members 44, 46 (formed by outer legs 70 of the second laminations 62) and also between the inner legs 74 of the ferromagnetic members. The side portions of the outer legs 72 of the ferromagnetic members 44, 46 extend less than half way across the width W of the windings 50, and the inner legs 74 extend only about half way across the width of the windings, so there is no interference between the overlapping portions of the ferromagnetic members. The inner legs 74 of the ferromagnetic members 44 on the first end cap 40 preferably touch or are closely spaced with the overlapping inner legs of the ferromagnetic members 46 on the second end cap 42 to carry the lines of flux through the center of the bobbin 48.

As shown in FIG. 13, the outer legs 72 of adjacent ferromagnetic members 44, 46 on the first and second end caps 40, 42, respectively, are spaced apart axially a distance D from each other. The spacing is provided by the shorter outer legs 70 of the second laminations 62 forming the side portions of the ferromagnetic members 44, 46. The spacing produces an air gap which inhibits flux leakage between adjacent ferromagnetic members 44, 46. The central portions of the outer legs of the ferromagnetic members 44, 46 are in partial alignment. The alignment tends to produce inductance between the aligned portions of the ferromagnetic members 44, 46 causing flux leakage adversely affecting the performance of the motor. To minimize the alignment, the outer legs are tapered near their free ends. The taper is preferably, but not necessarily, linear to correspond to the linear decrease in flux density across the width of the permanent magnet strip 36 to the free end of the outer leg 72. To illustrate the reduction in alignment, FIG. 14 rotates sections taken through adjacent ferromagnetic members 44, 46 in FIG. 9 into the same plane. However, the actual alignment of concern is the surface area alignment which produces magnetic coupling. Thus, the actual alignment which produces the magnetic coupling of adjacent poles is less than shown in FIG. 14. Never-the-less, FIG. 14 accurately illustrates that the surface area overlap of the outer legs 72 of the adjacent ferromagnetic members 44, 46 is lessened by tapering the free ends of the outer legs. The central portions of the outer legs 72 extend across the full width of the permanent magnet strip 36 on the rotor bell 32 to provide metal for carrying flux, but minimize the alignment of the ferromagnetic members 44, 46 which produces magnetic coupling, and hence flux leakage between adjacent ferromagnetic members.

Alternate ferromagnetic members, formed entirely from laminations of the same size and shape are shown in FIGS. 15A–15C and designated generally at 144A, 144B and 144C, respectively. The ferromagnetic members 144A–144B are described using reference numerals which are the same as for the ferromagnetic members 44, 46, plus 100. The ferromagnetic members are shaped to minimize the air gap and/or to induce the desired cogging torque for starting the motor. Like the previously described ferromagnetic members 44, 46, the outer legs 172A–172C are sized to extend from one end of a bobbin across windings on the bobbin a distance less than the full width of the windings. The bobbin and windings are not illustrated, but are substantially similar to the bobbin 48 and winding 50. However, the outer legs 172A–172C do extend substantially across the full width of the permanent magnet strip. The laminations forming the ferromagnetic member 144A are stacked, but not initially secured together. The unconnected stack of laminations is placed into a forming tool (not shown) which presses the stack against a form 173A which has the shape of two offset sections. Engagement with the form causes the laminations to slide relative to one another in the stack in directions parallel to the planes of the laminations. The radially outer leg of the ferromagnetic member formed by the stack thus has the offset shape of the form 173A which makes the air gap asymmetric and facilitates forming the desired cogging torque. The laminations are then secured together in fixed positions to form the ferromagnetic member 144A.

The laminations in a stack may alternatively be given a rhomboidal shape of ferromagnetic member 144B by being forced against form 173B shown in FIG. 15B. The angulation of the stack facilitates starting the motor, but does not closely conform to the curvature of the rotor bell 32 and inside diameter of the bobbin. The form 173C shapes the stack to form the ferromagnetic member 144C having the shape of an arcuate segment (FIG. 15C). The curvature of the outer leg 172C of the ferromagnetic member 144C closely conforms to the curvature of the rotor bell 32 and permanent magnet strip 36 to minimize the air gap. The inner leg 174C of the ferromagnetic member 144C also conforms to the curvature of the inner diameter of the bobbin permitting the inner diameter of the bobbin to be reduced somewhat. To produce the desired cogging torques, the ferromagnetic member 144C may be mounted on an end cap (not shown) in a radially offset manner as done for the ferromagnetic members 44, 46. The stack of identical laminations may be shaped other than described herein without departing from the scope of the present invention.

The shaped ferromagnetic members 144A–144C are shorter from end to end than the ferromagnetic members 44, 46 formed by the first and second laminations 60, 62 of different sizes to avoid physical interference and flux leakage with adjacent ferromagnetic members. Where the angular extent of the ferromagnetic members 44, 46 was about 45° mechanical (180° electrical) in an eight pole motor, the extent of the ferromagnetic members 144A–144C would be about 30° mechanical (120° electrical) in the same eight pole motor.

In another version of the ferromagnetic members shown in FIGS. 16–18, the ferromagnetic members are compression molded as a one piece stator yoke 144D from powdered ferromagnetic material with a binder. Instead of four separate ferromagnetic members, the stator yoke 144D has a single, unitary inner ring 174D and four angularly spaced outer legs 172D which in the assembled motor (not shown) extend from one end of the bobbin across the windings a distance less than the full width of the windings. The outer legs 172D may extend across the full width of the windings, and beyond, without departing from the scope of the present invention. The bobbin and windings are not shown, but would be substantially the same as bobbin 48 and windings 50. The outer legs 172D are preferably sufficiently long to extend across the full width of the permanent magnet strip 36 on the rotor bell 32. As best seen in FIG. 18, the outer legs 172D are accurately shaped to conform to the curved shape of the rotor bell 32 and permanent magnet strip 36 to minimize the air gap. An identical stator yoke 144D (shown in phantom) is positioned on the opposite end of the bobbin in an angularly offset orientation so that the outer legs 172D of each stator yoke are located between the outer legs of the other stator yoke. The relative positions of the outer legs 172D of the two stator yokes 144D as they would be positioned on the bobbin in the motor are illustrated in FIG. 18. The bobbin and windings are not shown for clarity. To facilitate starting the motor in the right direction, the outer legs may be shaped asymmetrically (not shown), such as by cutting a notch in the outer leg, or varying the radius of curvature of the outer leg. The interior ring 174D on each stator yoke 144D extends into the central opening of the bobbin about half the axial dimension of the bobbin opening.

The stator assembly of the preferred embodiment includes the bobbin 48, windings 50 carried on the bobbin, the first and second end caps 40, 42 and ferromagnetic members 44, 46 mounted on the end caps. As shown in FIG. 2, the sleeve bearing 38 is completely received in the central tubular portions 78, 82 of the first and second end caps 40, 42. The rotor shaft 34 is received through the sleeve bearing 38 with a substantial portion of the stator assembly received in the rotor bell 32. The rotor shaft 34 is mounted on the rotor bell 32 by insert casting employing a zinc material. The zinc around the shaft 34 is formed into a spacer 90 for operatively engaging the bearing 38 to axially space the rotor bell 32 from the bearing and stator assembly. A mylar disk 92 is disposed between the spacer 90 and the bearing 38 to reduce friction between the spacer and bearing.

The bearing 38 is impregnated with a lubricant and sized sufficiently large so that the bearing is self-lubricating over the entire life of the motor. Referring to FIGS. 19 and 20, the bearing 38 is preferably molded from a powdered metal to have a central longitudinal throughhole having a smaller diameter in end regions 94 than in a middle region 96. The rotor shaft 34 contacts and is supported by the sleeve bearing 38 only in the smaller diameter end regions 94 of the bearing. The two spaced locations of engagement provide a solid mount for the rotor shaft 34, while minimizing the overall surface area engagement between the shaft and the bearing 38.

A preferred application for the inside out motor of the present invention is to drive the fan 56. As shown in FIGS. 2 and 3, a cup-shaped hub 98 of the fan 56 fits over the rotor bell 32 and is integrally formed with fan blades 100. Only two fan blades 100 are shown in FIG. 2, the remainder being removed for clarity of the drawing. The second end cap 42 mounts the motor and fan 56 on the shroud 58. The shroud includes an outer rim 102, a central cup 104 (broadly, "central member") and four spokes 106 extending between and connecting the cup and rim. The assembled motor is connected to four mount tabs 108 projecting radially outwardly from the periphery of the cup 104. The connection of the motor to the shroud 58 is described more fully below. The tabs 108 are each strengthened by a pair of gussets 110 formed integrally with the tab and the cup 104. The outer rim 102 of the shroud 58 has three slots 112 for receiving fasteners (not shown) to mount the shroud to a suitable mounting surface such as a duct. Thus it may be seen that the shroud 58 provides the sole means of support for the motor.

The spokes 106 are formed to hold the motor and fan 56 rigidly against pitch and yaw motion, but to permit some small, dampened roll motion. Referring to FIG. 21, the spokes 106 are generally T-shaped in cross section. The "T" has a leg 106A which provides material to resist bending of the spokes 106 about axes perpendicular to the longitudinal axis of the rotor shaft 34. Another leg 106B of the "T" is curved and provides a lesser resistance to bending of the spoke 106 about axes parallel to the axis rotor shaft 34. However, a certain small amount of roll motion (i.e., pivoting about the rotor shaft axis) is permitted which is dampened by the material of the spokes 106. Thus, the normal cogging torques from the motor are absorbed by the spokes 106, permitting the motor to run with less vibration and mechanical noise. The curved leg 106B of each spoke 106 is located closest to the fan blades 100. The curved leg 106B slopes away from the fan blades 100 toward its free ends so that the flow of air from the fan blades (indicated by arrow A in FIG. 21) are presented with a gently curved surface. Thus, air noise from the air passing the spokes 106 of the shroud 58 is thereby reduced.

The inside out motor of the present invention may be rapidly and accurately assembled from its component parts. The following description of a method for assembling the motor, including attachment of the fan 56 and mounting on the shroud 58, is made with reference to FIG. 22 of the drawings. The ferromagnetic members 44, 46 are formed by stamping the first and second C-shaped laminations 60, 62 from ferromagnetic sheet material, and stacking the laminations together as described above. Four of the ferromagnetic members 44 are positioned in a first end cap 40 forming mold and another four ferromagnetic members 46 are positioned in a second end cap 42 forming mold (not shown). Plastic is injected into the respective molds around the ferromagnetic members 44, 46 to form the first and second end caps 40, 42 and simultaneously secure the ferromagnetic members to the end caps.

The sleeve bearing 38 is preassembled with the first end cap 40 by forcing an end of the bearing having a knurled surface 112 into the central tubular portion 78 of the first end cap. The knurled surface 112 facilitates the formation of a friction fit between the bearing 38 and first end cap 40. It is also envisioned that the bearing 38 could be placed into the mold of the first end cap along with the four ferromagnetic members 44, 46. In that case, the central tubular portion of the first end cap (not shown) would be long enough to cover substantially the entire bearing. The tubular portion would be molded around a bulging out central portion 114 of the bearing 38 thereby to secure the bearing in the tubular portion. The central tubular portion of the second end cap (not shown) would be substantially shorter in length to accommodate the increased length of the tubular portion of the first end cap.

The bobbin 48 is preferably molded from a suitable polymeric material and wound with one or more windings 50. When more than one winding is used, the windings may be bifilar or wound one over the other in a layered arrangement. In the illustrated embodiment, there are two windings 50, the terminal ends of which are received in respective connector portions 116 of the bobbin 48 (see also FIG. 24). The terminal ends of each of the windings 50 are connected to male terminal connectors 118 mounted on the connector portion 116 of the bobbin 48. The wound bobbin is mounted on the first and second end caps 40, 42 by aligning four mounting posts 120 on each axial end of the bobbin with corresponding openings 121 on the first and second end caps (see FIGS. 10 and 11). The mounting posts 120 are formed as one piece with the bobbin 48 at the same time the bobbin is formed. The posts 120 are inserted through the respective openings 121 and deformed as by sonic welding into the a generally rivet head shape to prevent withdrawal of the posts back out of the openings. Rivet heads 120A made by deforming the mounting posts 120 may be seen in FIG. 24. The C-shaped ferromagnetic members 44, 46 receive portions of the bobbin 48 and windings 50 between their outer and inner legs 72, 74. The attachment of the bobbin 48 to the first and second end caps 40, 42 forms the stator assembly.

The rotor shaft 34 is mounted on the interior of the rotor bell 32. The mounting of the rotor shaft 34 leaves the spacer 90 formed from the mounting material (e.g., zinc). The permanent magnet strip 36 is formed by an annular strip of magnetized material which is mounted on the interior surface of the rotor bell 32. However, there could be separate magnets (not shown) spaced around the interior of the rotor bell 32 without departing from the scope of the present invention. The strip 36 is magnetized to have eight distinct poles spaced apart around the strip. In this preferred embodiment, the poles are skewed with respect to the longitudinal axis of the rotor shaft 34 by angling the magnetized region of the strip 36 at the poles. The skew is preferably about 10°–15° for the eight pole motor of the illustrated embodiment. It is to be understood that the angle of skew may be other than described and still fall within the scope of the present invention. The skew is measured by looking along the longitudinal axis of the rotor shaft 34 and drawing two radial lines from the axis, one to a point on one transverse edge of the permanent magnet strip 36 and the other to a point on the opposite transverse edge of the strip. The angle these two radial lines make with each other as viewed along the longitudinal axis is the angle of skew.

The fan 56 is formed in a suitable manner, such as by molding the hub 98 and fan blades 100 as one piece from polymeric material, and fitted over the rotor bell 32. The hub 98 is secured to the rotor bell 32 in a suitable manner such as by heat staking, snap fit or press fit. The mylar disk 92 is placed on the rotor shaft 34, which is then inserted through the sleeve bearing 38 of the stator assembly. A C-clip 122 (FIG. 24) is snapped onto the grooved distal end of the rotor shaft 34 to secure the shaft from moving out of the bearing 38. At the same time, the mylar disk 92 is sandwiched between the spacer 90 and the bearing 38 near the opposite end of the rotor shaft 34 to permit low resistance movement by the rotor bell 32 relative to the bearing.

Figure 23:
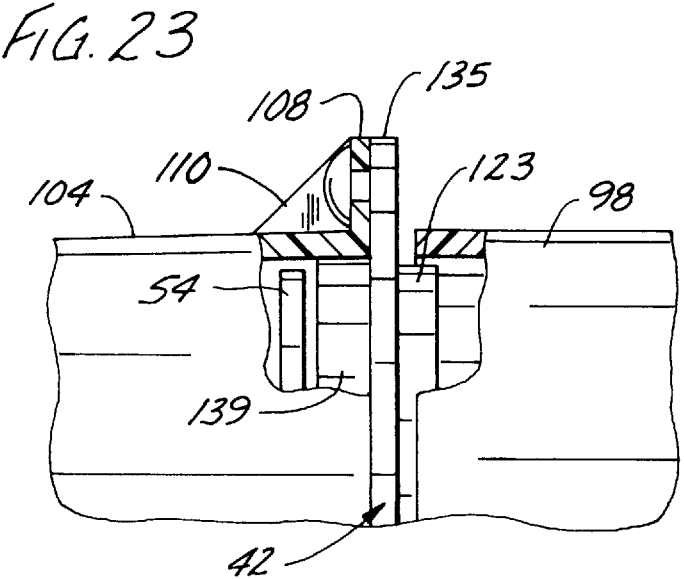
FIG. 23 is an enlarged, fragmentary side elevational view of the motor showing the overlap of a hub of the fan and the second end cap for closing the interior of the motor.

As shown in FIG. 23, the open end of the fan hub 98 fitted onto the rotor bell 32 axially overlaps an annular flange 123 formed on the periphery of the second end cap 42. The hub 98 is in closely radially spaced relation with the flange 123 around the entire circumference of the second end cap 42. The spacing permits the hub 98 to rotate relative to the second end cap 42 without interference from the flange 123. The hub 98 and the second end cap 42 are both made of an electrically insulating material and together substantially enclose the windings 50 and ferromagnetic members 44, 46. The size of the gap is selected to be sufficiently small so that small objects cannot be inserted through the gap, and regulations will allow the metal parts (i.e., the ferromagnetic members 44, 46 and the rotor 30) not to be grounded. Thus, there is very little line interference produced by the motor.

The Hall device unit 88 is formed by connecting the leads from a conventional Hall device (not shown) to output terminal connectors 124 and casting the terminal connectors and Hall device together in a block of plastic (FIG. 22). The Hall device unit 88 is inserted into the pocket 86 formed as one piece with the second end cap 42 and projecting axially inwardly from the second end cap to a location adjacent the windings 50 (FIG. 12). The Hall device unit 88 has an exterior surface having a shape complementary to that of the interior of the pocket 86. Thus, the Hall device unit 88 is held in the pocket 86 by an interference fit between the pocket and the unit. The terminal connectors 124 project axially out of the pocket 86 and away from the second end cap 42.

Figure 24:
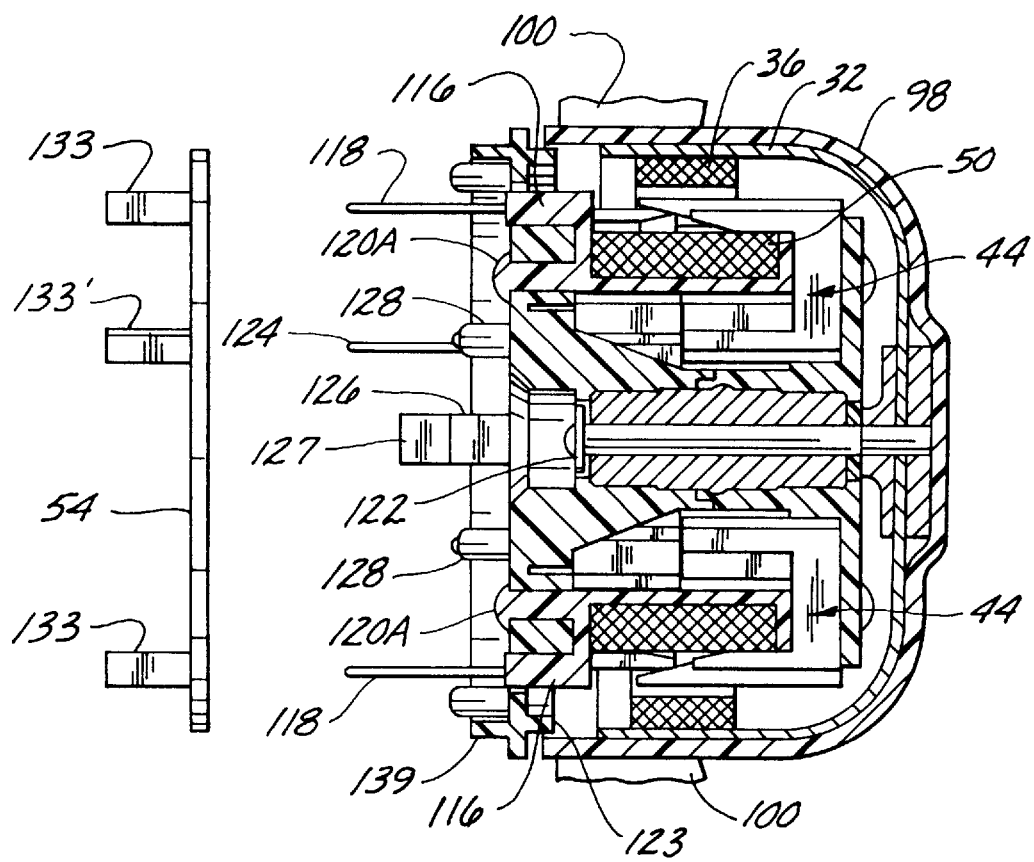
FIG. 24 is an enlarged, fragmentary sectional view taken in the plane including line 24—24 of FIG. 2 with the shroud removed and a snap-on, printed circuit board exploded away from the remainder of the motor.

Referring to FIG. 24, the printed circuit board 54 for the motor is attached to the second end cap 42 without the use of fasteners. More specifically, the circuit board 54 has a pair of diametrically opposed notches 125 in its periphery (FIG. 1) which are aligned with snap latch members 126 formed as one piece with the second end cap 42. The snap latch members 126 have wedge shaped heads 127 which engage the circuit board 54 in respective notches 125. The resiliency of the second end cap material permits the snap latch members 126 to flex outwardly as the circuit board 54 is pushed toward the second end cap 42. Once the circuit board 54 is pushed past the heads 127 and in registration with thinner parts of the snap latch members 126, the snap latch members snap radially inwardly so that portions of the heads overlie the axially outer side of the circuit board and hold it on the stator assembly.

As shown in FIG. 12, the second end cap 42 has four posts 128 on its axially outer surface. These posts 128 engage the axially inner side of the circuit board 54 in openings 129 formed in the printed circuit board (FIG. 1) as it is snapped onto the second end cap 42. Thus, the circuit board 54 is securely held between the heads 127 of the snap latch members 126 and the posts without the use of separate fasteners. The printed circuit board 54 as mounted on the second end cap 42 is shown in FIG. 3.

At the same time the printed circuit board 54 is mounted on the second end cap 42 of the stator assembly, electrical connections for the windings 50 and the Hall device unit 88 are made. Referring again to FIGS. 22 and 24, the connector portions 116 of the bobbin 48 are received through openings 131 in the second end cap 42 so that the winding terminal connectors 118 project axially outwardly from the second end cap. The printed circuit board 54 has bottom entry female connectors 133 mounted on its axially outer side. There is one bottom entry connector 133 for each winding and Hall device terminal connector 118, 124. The Hall device bottom entry connectors are designated by 133'. The bottom entry connectors 133 are mounted over holes in the circuit board 54 (FIG. 1) so that when the board is pushed onto the second end cap 42 the windings 50 and Hall device unit terminal connectors 118 are received through the holes and into their respective bottom entry connectors to make electrical connection of the windings and Hall device with the printed circuit board 54.

The inside out motor and fan 56, as thus assembled, are then mounted on the shroud 58, as shown in FIGS. 2 and 3. The second end cap 42 is formed with tabs 135 and mounting posts 137 extending axially outwardly from the tabs. The posts 137 are received through openings in the corresponding tabs 108 on the shroud 58. The posts 137 are then deformed as by sonic welding into the shape of rivet heads 137A which prevent the withdrawal of the mounting posts from the tab openings (FIG. 2). The tabs 135 of the second end cap 42 and the tabs 108 of the shroud 58 are held in face-to-face engagement. The inside out motor and fan 56 are thereafter prepared for mounting on a surface by the shroud 58 by passing fasteners through the slots 112 on the periphery of the shroud. An annular flange 139 on the axially outer surface of the second end cap 42 is received within the shroud 58 (FIG. 23).

The cup 104 of the shroud 58 is formed with a radially recessed portion 141 for receiving a power connector (not shown) for connecting the printed circuit board 54 to an exterior power source. At the axially inner end of the recess, slits 143 provide access through the shroud 58 for the power connector to plug into the circuit board 54. The recessed portion 141 positions the power connector within the cup 104 and out of the flow of air from the fan blades 100. There is preferably no fixed connection between the power connector and the circuit board 54, to permit the motor to be easily disconnected from the power source for replacement or repair. To that end, the material of the cup 104 around the slits is projected axially inwardly to form a pair of supports 145 (FIG. 3, only one is shown). The supports 145 are engageable with the printed circuit board 54 when the power connector is unplugged from the circuit board, to support the board against the stresses applied by the action of unplugging the power connector.

Figure 25:
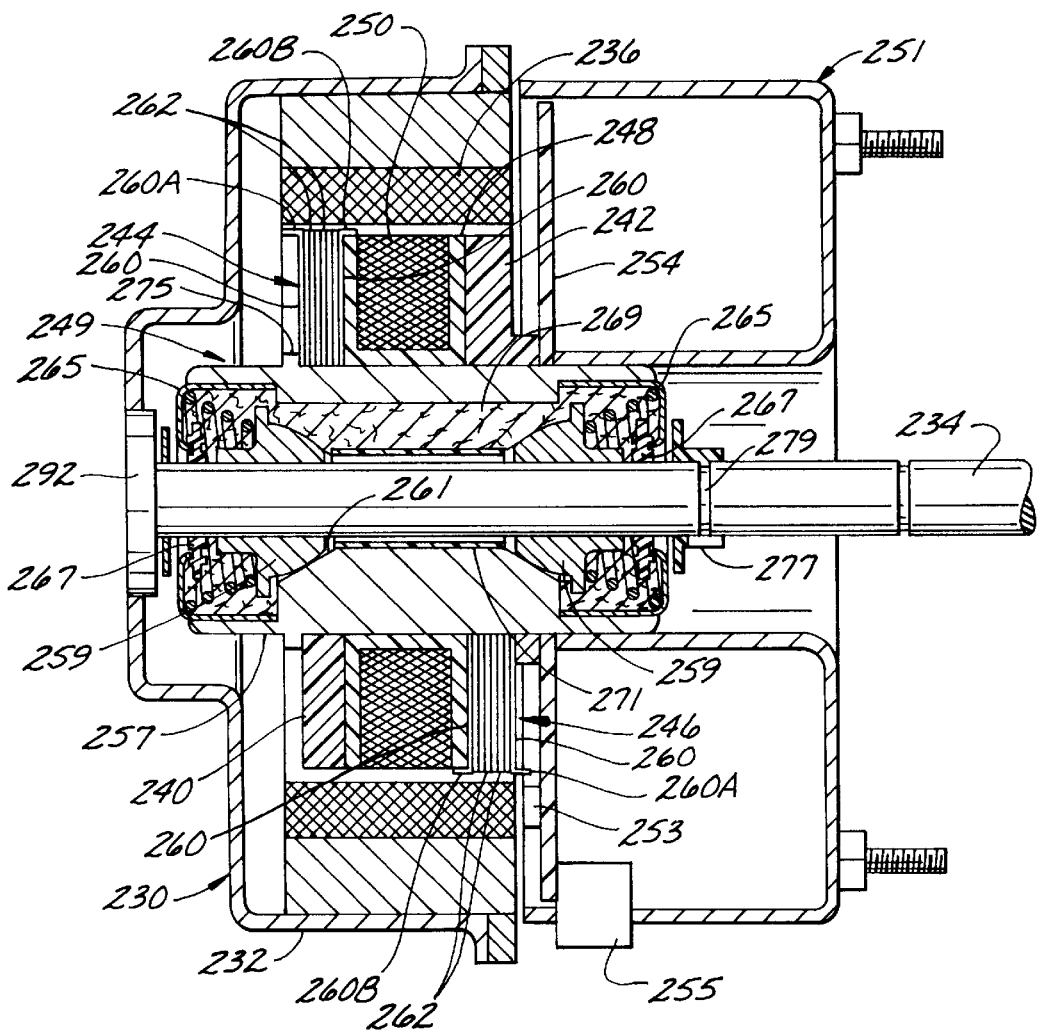
FIG. 25 is a longitudinal section taken on the same angle as the section line 3—3 of FIG. 2, but showing an inside out motor of a second embodiment having a self aligning bearing system.

An inside out motor of a second embodiment is shown in FIG. 25 to comprise a stator assembly, a rotor 230, a self-aligning bearing system 249, and an end closure 251 (all parts being designated generally by their respective reference numerals). The parts of the motor of the second embodiment corresponding to those of the first embodiment will be designated by the same reference numerals plus 200. The stator assembly includes a bobbin 248 of polymeric material having one or more windings 250 wound thereon. Ferromagnetic members 244, 246 are formed by stacking laminations stamped from ferromagnetic sheet material.

The ferromagnetic members 244, 246 are mounted on first and second end caps (designated generally at 240 and 242, respectively). In the illustrated embodiment, four ferromagnetic members 244 are spaced at 90° intervals around the periphery of the first end cap and four other ferromagnetic members 246 are spaced at 90° intervals around the periphery of the second end cap 242. The illustrated motor is an eight pole motor. The number of ferromagnetic members 244, 246 on the end caps 240, 242, and their angular spacing may be other than described without departing from the scope of the present invention. As assembled in the motor, the ferromagnetic members 244 of the first end cap 240 are angularly offset from the ferromagnetic members 246 of the second end cap 242 by 45°. However because of the angle of the section taken for FIG. 25, ferromagnetic members 244, 246 on both end caps 240, 242 are shown. The laminations in each ferromagnetic member are stacked so that the planes of the laminations are perpendicular to the rotation axis of the rotor 230. However, the arrangement of the ferromagnetic members 44, 46 of the first embodiment of the motor could be used. The bobbin 248 and windings 250 are disposed between the end caps 240, 242 in the assembled motor.

As shown in FIG. 25, the top and bottom laminations 260 are made larger than the remaining laminations 262 in the stacks forming the ferromagnetic members 244, 246. In the stack, edge margins of the larger laminations 260 extend radially outwardly from the corresponding edges of the other laminations 262 in the stack. These protruding edge margins are bent axially in opposite directions, as indicated by reference numerals 260A and 260B, respectively in FIG. 25. The bent edge margins 260A, 260B position the metal in the edge margins for carrying additional flux, thereby improving the efficiency of the motor. It is envisioned that only one of the larger laminations 260 could be used. If the one lamination 260 is the axially inner of the two, having bent edge margin 260B, this permits the permanent magnet strip 36 to be narrower.

The rotor 230 comprises a rotor bell 232 and a rotor shaft 232 mounted on the bell. The rotor shaft 232 is received through the bearing system 249 for supporting the rotor 230 for rotation relative to the stator assembly. The rotor bell 234 has an annular strip 236 of magnetized material mounted on an annular member on the interior surface of the rotor bell. The rotor bell 232 receives substantially all of the stator assembly inside the bell with the windings 250 and ferromagnetic members 244, 246 in radial registration with the permanent magnet strip 236.

The end closure 251 is generally toroidal in shape, having a rectangular cross section. The end closure 251 is hollow and is open at its axially inner end. A printed circuit board 254 is mounted between the end closure 251 and the stator assembly. The various control devices on the circuit board 254 used to operate the electronically commutated motor are not illustrated for clarity in the drawings. The windings are connected to the circuit board by a connector 253. The board 254 receives electrical power by connection to an external power source (not shown) through a connector 255 which extends through the side of the end closure 251.

The bearing system 249 includes a generally tubular bearing core 257 preferably molded from powdered metal material, and a pair of spherical bearings 259 disposed at opposite ends of the bearing core. The rotor shaft 234 is received through the spherical bearings 259 for rotation with the bearings. The spherical bearings 259 engage opposite longitudinal ends of three fins 261 which project inwardly from the interior surface of the bearing core 257. End surfaces 263 of the fins 261 slope axially inwardly toward the longitudinal axis of the bearing core 257. Thus, the fin end surfaces 263 define three-line cones on each end of the bearing core 257 for engaging the spherical bearings 259. Bearing core caps 265 close the ends of the bearing core 257, and provide reaction surfaces for coil springs 267 which engage the caps and the spherical bearings 259 to hold the bearings against the bearing core and to encourage alignment of the rotor shaft 234.

Figure 26:
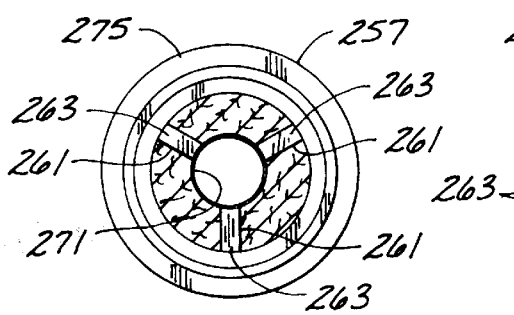
FIG. 26 is an end view of a bearing core of the self-aligning bearing system.

The bearing core 257 contains a lubricant material 269, such as a fibrous material saturated with an oil for lubricating the rotor shaft 234 and bearing core over the lifetime of the motor. The lubricant 269 can be injected under pressure into the bearing core 257, but holds its shape once in the bearing core. As shown in FIG. 26, a plastic tube 271 is disposed concentrically with the bearing core 257 and, in combination with the fins 261, defines three compartments containing the lubricant 269 and separates the spinning rotor shaft 234 from direct contact with the lubricant. Of course the precise number of fins and lubricant compartments may be other than described without departing from the scope of the present invention. However, the three fins 261 provide a solid base for the spherical bearings 259 while minimizing the surface area of the bearing core 257 which engages the spherical bearings.

The core caps 265 help to contain the lubricant 269 within the bearing core 257. However, oil on the rotor shaft 234 tends to migrate axially out of the bearing core 257 as the rotor shaft spins. Therefore, conventional slingers 273 are mounted on the shaft 234 at each end of the bearing core 257 to capture the oil and sling it outwardly into the lubricant material 269.

Figure 27:
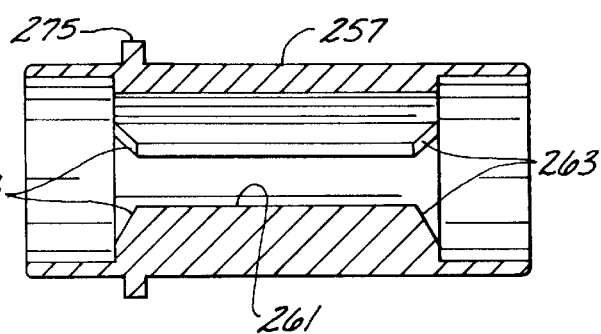
FIG. 27 is a longitudinal section of the bearing core.

The inside out motor of the second embodiment is readily assembled with the bearing core 257 serving as a single object on which all components of the motor are directly mounted. Preferably the bearing system 249 is first formed by providing the bearing core 257, as is shown in FIG. 27. The plastic tube 271 is inserted into the bearing core 257 and held in its concentric location by the fins 261. The spherical bearings 259 are seated on the fins 261 at longitudinally opposite ends of the bearing core 257, and secured in place by press fitting the core caps 265 onto the bearing core. The springs 267 in the core caps 265 engage the spherical bearings 259 and urge them against the end surfaces 263 of the fins. The lubricant 269 is then injected into the bearing core 257, filling a portion of its interior. The bearing assembly thus formed is ready for use to assemble the stator assembly, rotor 230 and end closure 251.

The first end cap 240 is slid onto the bearing core 257 from the right end of the core as seen in FIG. 25. The first end cap 240 slides to the left until engaging an annular stop 275 formed as one piece with the bearing core 257. It is envisioned that a ring (not shown) separate from the bearing core could be engaged on the bearing core to function as the stop instead of the integrally formed stop 275. The previously wound bobbin 248 is slid onto the bearing core 257 next, followed by the second end cap 242. The printed circuit board 254, which has a central opening, slides onto the bearing core 257 and into engagement with the second end cap 242. The action of sliding the circuit board 254 onto the bearing core 257 will automatically result in a plug in connection of the windings 250 with the connector 253 mounted on the circuit board.

No fasteners are used to secure the stator assembly and the printed circuit board 254 on the bearing core 257. The end closure 251 is press fitted onto the end of the bearing core 257, thereby fixing the first end cap 240, bobbin 248 and second end cap 242 between the end closure and the stop 275 formed on the bearing core 257.

The rotor shaft 234, having been previously mounted on the rotor bell 232, is inserted through the bearing system 249. A mylar disk 292 is placed around the shaft 234 prior to insertion through the bearing system 249 to provide a low friction surface between the rotor bell 232 and the core cap 265 nearest the bell. A retainer 277 made of a resilient material is snapped into in a groove 279 in the rotor shaft 234 adjacent to the opposite end of the bearing core 257. The retainer 277 prevents the rotor shaft 234 from being withdrawn from the bearing core 257. The spherical bearings 259 permit movement of the rotor shaft 234 to so that the rotor 230 is self-aligning.

Figure 28:
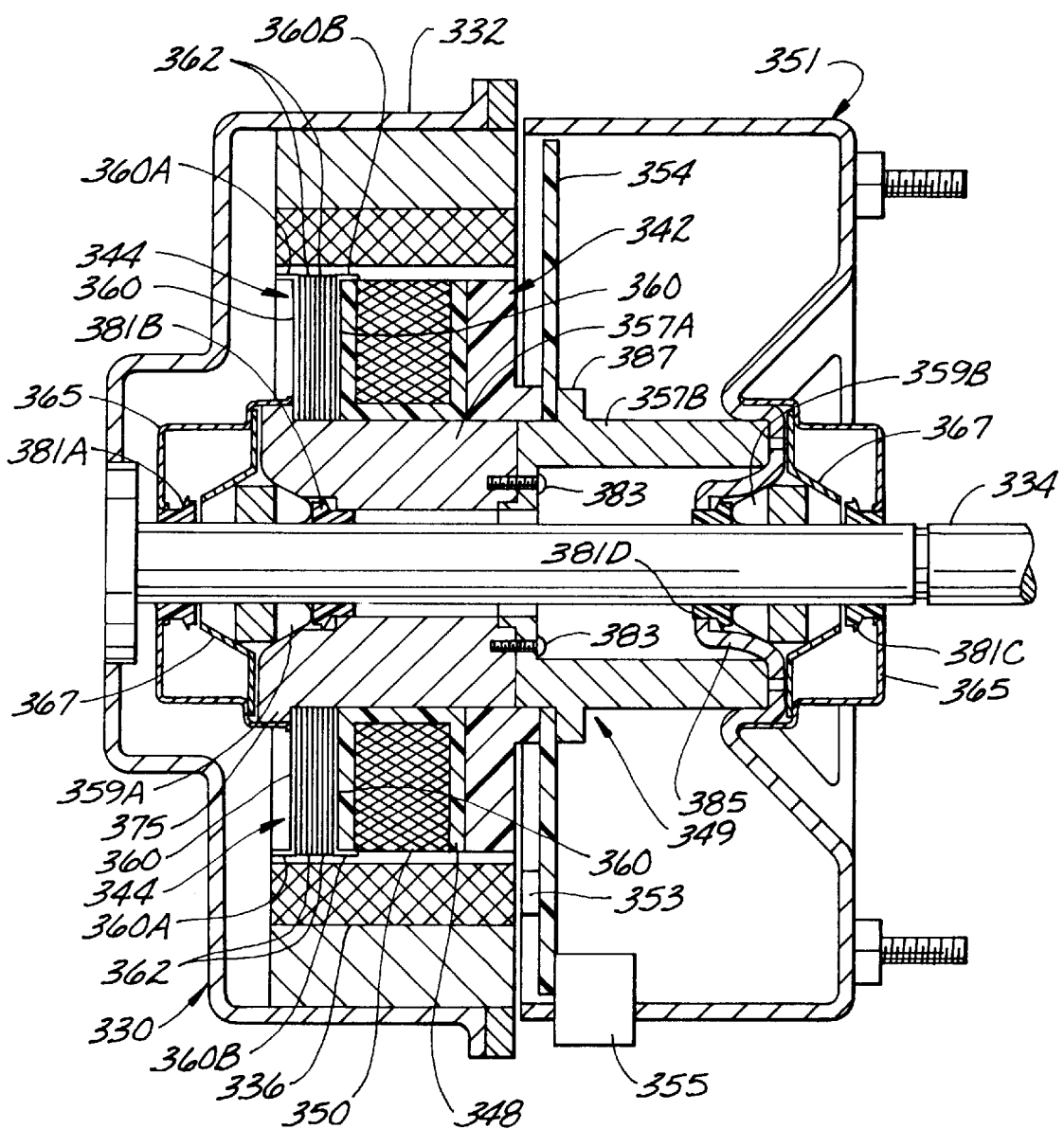
FIG. 28 is a longitudinal section of an inside out motor of a third embodiment having a self-aligning bearing system.

An inside out motor of a third embodiment is shown in FIG. 28. The construction of the motor is similar to that of the motor of the second embodiment. Corresponding parts are designated by the same reference numerals as for the motor of the second embodiment, plus 100. The stator assembly, rotor 330 and the printed circuit board 354 are substantially identical to their counterparts in the motor of the second embodiment. The stator assembly appears different only because FIG. 28 is a true longitudinal section of the motor so that only the ferromagnetic members 344 on a first end cap (not shown in FIG. 28) are seen.

The self-aligning bearing system 349 has a two piece bearing core, including a generally tubular inner member 357A and generally tubular outer member 357B. The left axial end of the inner member 357A (as seen in FIG. 28) is formed with a curved surface for receiving a spherical bearing 359A. The curved surface has a shape closely corresponding to the shape of the spherical bearing 359A to permit pivoting movement of the spherical bearing relative to the inner member 357A of the bearing core. The spherical bearing 359A is engaged by a retaining collar 367 which urges the bearing into engagement with the inner member 357A of the bearing core. The bearing 359A and the retaining collar 367 are covered by a core end cap 365 which is press fitted onto the left end of the inner member 357A. A first seal 381A mounted on the end cap 365 sealingly receives a rotor shaft 334, and a second seal 381B mounted on the inner member 357A axially inwardly of the spherical bearing 359A also sealingly receives the shaft. The seals 381A, 381B operate to retain lubricant (not shown) around the bearing 359A in the left end of the bearing core inner member 357A.

The outer member 357B mounts the printed circuit board 354 and is attached as by bolts 383 to the inner member 357A of the bearing core to clamp the stator assembly components and the circuit board against a flange 375 formed on the inner member. An end closure 351 is press fitted onto the right axial end of the outer member 357B. A bearing surface piece 385 mounted on the right axial end of the outer member 357B and received within the open end of the outer member is shaped to receive another spherical bearing 359B. The bearing surface piece 385 has a curved shape closely corresponding to the shape of the spherical bearing 359B to permit the spherical bearing to pivot relative to the bearing core outer member 357B.

The spherical bearing 359B is engaged by a resilient retaining collar 367 which urges the bearing against the bearing surface piece 385. A core end cap 365 is press fitted onto the end closure 351 around the right end of the outer member 357B of the bearing core. The core cap 365 holds the retaining collar 367 and mounts a third seal 381C through which the rotor shaft 334 passes. A fourth seal 381D is mounted on the bearing surface piece 385 axially inwardly of the spherical bearing 359B. The third and fourth seals 381C, 381D, along with the bearing surface piece 385 and the core end cap 365, retain lubricant in the region around the spherical bearing 359B.

The motor is assembled by pre-forming the inner member 357A of the bearing core with the spherical bearing 359A, retaining collar 367, seals 381A, 381B and core end cap 365. The first end cap (not shown) carrying ferromagnetic members 344 has a central opening which permits it to slide onto the inner member 357A and into engagement with the flange 375. The wound bobbin 348 slides onto the inner member 357A, followed by the second end cap 342. The circuit board 354 is placed on the left end of the outer member 357B of the bearing core, which is then inserted into the second end cap 342. This assembly is secured by the bolts 383. A flange 387 on the outer member 357B engages the circuit board 354 for clamping the board, second end cap 342, bobbin 348 and first end cap (not shown) on the bearing core.

The bearing surface piece 385, including the fourth seal 381D, is secured in the right axial end of the outer member 357B of the bearing core, and the end closure 351 is attached to the outer member. The spherical bearing 359B is placed into engagement with the bearing surface piece 385 and the retaining collar 367 is placed over the bearing. The bearing 359B and retaining collar 367 are secured by press fitting the core end cap 365 onto the end closure 351 around the right end of the outer member 357B. The core end cap 365 includes the third seal 381C. Lubricant will be injected into the region surrounding the spherical bearing 359B prior to final closure of the right end of the bearing core by the core end cap 365 and third seal 381C. The rotor shaft 334 of the rotor 330 is inserted through the bearing system 349, sealingly engaging the seals 381A–381D to complete the assembly.

Several design aspects of the inside out motor described above in its various embodiments affect the back emf. In general, as a first order effect, the back emf of the motor is proportional to the number of poles and the number of turns of the coil on the bobbin. This is due, in part, to the fact that all poles (i.e., all ferromagnetic members) are magnetically driven in parallel by the same winding coil whereas other types of motors generally use a separate coil to drive each pole. By increasing the number of poles, the number of turns can be reduced (to reduce the cost of the coil) while maintaining the magnitude of the back emf. Reducing the number of turns reduces the resistance of the coil because it reduces the length of the current path through the coil. As a result, increasing the number of poles coupled with a corresponding decrease in the number of turns maintains motor efficiency. Also, increasing the number of poles while maintaining the same number of turns in the coil increases motor efficiency. Also, the tapered free ends of the laminations can affect the shape of the back emf waveform.

The motor also has several features which control the parking point of the rotor and which change the shape of the cogging torque. The asymmetrical air gap, which is larger, on average, over one half of the outer leg of each pole (ferromagnetic member) than the other half of the pole, provides several advantages in this regard. By changing the shape of the air gap either by offsetting the stack or changing the circumferential symmetry of the stack, or both, the parking point can be moved to avoid a zero or low torque position when the winding is energized and the shape of the cogging torque can be modified to be more smooth and remove or minimize detrimental parking points. If one of the poles is notched or truncated to receive a Hall device, the notch can be placed where it is desirable to produce the most dramatic reshaping of the cogging torque. The permanently magnetized regions of the rotor may be skewed to aid the parking of the rotor in a starting position which is not a zero torque position and to smooth the cogging torque curve and remove detrimental parking points.

In order to reduce the demagnetizing effects on the permanent magnets of the rotor, several features of the invention can be employed. The central portions of the outer legs of the poles (ferromagnetic members) are longer than the side portions of the outer legs so the central portion conducts more magnetic flux than the side portions. In addition, the shorter portions of the outer legs provide axial spacing between adjacent poles to avoid increased inductance and the resulting demagnetizing effects. The overlap between adjacent poles should be minimized and the gap between adjacent ferromagnetic members should be maximized so that the leakage inductance between poles is minimized thereby reducing the effect of the demagnetizing field on the rotor. Thus, the outer legs of the poles may preferably extend axially across substantially the full width of the permanent magnet, but no further. The tapered free ends of the outer legs of the poles also lessen the overlap.

In order to reduce magnetic field losses and increase motor efficiency, laminations having wider inner and outer legs are used in the central portion of the stack while laminations having narrower inner and outer legs are used for the side portions. The pole formed by the laminations approximately (i.e., as a step function may approximate a curve) takes the shape of the curvature of the rotor bell and permanent magnet on its outer leg, and the curvature of the inner diameter of the bobbin on its inner leg by using only two different sized laminations. This reduces magnetic field losses due to magnetic saturation of the inner legs of the poles. Alternatively, the laminations forming the poles can be shaped to approximate the curvature of the rotor bell, permanent magnet and bobbin, reducing the size of the air gap between the pole and the permanent magnet. The reduction makes the motor more efficient as more magnetic flux is carried by the poles. The free ends of the outer legs extending across the permanent magnet are preferably tapered in a linear manner which provides a linear increase in flux conducting material corresponding to the linear increase in flux density across the width of the permanent magnet. Also, the side portions of the outer legs of the poles are shorter than the central portions of the outer legs to reduce flux leakage between adjacent upper and lower poles.

Other features of the invention also have an impact on the magnetics of the motor. The use of laminations oriented in planes parallel to the axial extension of the winding coil rather than a solid core or core made up of laminations oriented perpendicularly to the axial extension of the winding coil reduces eddy currents within the lamination stack because the oxides on the surface of the laminations form an electrically insulating layer which breaks up the magnetic eddy currents. On the other hand, the use of a composite of binder and iron powder which is compression molded to form the poles (e.g., the stator yoke) also tends to break up the eddy currents because of the insulating material which is part of the binder. The composite avoids the need for stacking thereby providing lower costs but may have somewhat lower permeability (magnetic resistance) and higher hysteresis losses, depending on its composition.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An inside out motor comprising:
    a rotor including a concave member, a shaft mounted on the concave member and magnet means mounted on an interior surface of the concave member, said magnet means being spaced from the shaft and extending circumferentially on the concave member around the longitudinal axis of the shaft;
    bearing means receiving the shaft for rotatably mounting the rotor;
    a stator assembly mounted on said bearing means, the stator assembly including a bobbin mounted generally coaxially with the rotor shaft and having an interior diameter and an exterior diameter, a winding wound on the bobbin and extending around the axis of the rotor shaft, the winding having a width in a direction parallel to the lengthwise extension of the rotor shaft, a first ferromagnetic member having a radially outer leg extending between the winding and the magnet, the outer leg extending generally from a first axial end of the bobbin toward an opposite second axial end a distance substantially less than the width of the winding, and a second ferromagnetic member including a radially outer leg extending generally from the second end of the bobbin toward the first end a distance substantially less than the width of the winding, such that the leakage inductance between the members is reduced;

said first and second ferromagnetic members being molded from a powdered ferromagnetic material;

said first and second ferromagnetic members being disposed in angularly spaced positions around the longitudinal axis of the rotor shaft, each of said first and second ferromagnetic members being located so that the ferromagnetic member is asymmetrical about all planes including the longitudinal axis of the rotor shaft whereby the ferromagnetic members are each positioned to define an asymmetrical air gap between the ferromagnetic member and the rotor to facilitate starting the motor.

2. An inside out motor as set forth in claim 1 wherein the outer legs of each of said first and second ferromagnetic members are tapered toward their free ends thereby to reduce inductance between circumferentially adjacent ferromagnetic members.

3. An inside out motor as set forth in claim 1 wherein the first and second ferromagnetic members are each in radially opposed relation to said magnet means of the rotor, the first and second ferromagnetic members and said magnet means defining respective air gaps therebetween having circumferentially opposite ends, the air gap being greater at one of the circumferentially opposite ends than at the other circumferentially opposite end.

4. An inside out motor as set forth in claim 1 wherein said first and second ferromagnetic members each comprise a plurality of generally C-shaped laminations disposed in a stack defining the ferromagnetic member, the laminations being oriented so that the laminations lie in planes parallel to the longitudinal axis of the rotor shaft.

5. An inside out motor as set forth in claim 4 wherein the C-shaped laminations comprise first and second C-shaped laminations each having a radially inner leg and a radially outer leg, the outer legs of the first C-shaped laminations being longer than the outer legs of the second C-shaped laminations, at least some of the ferromagnetic members comprising a central portion made up of the first laminations and side portions on either side of the central portion made up of the second C-shaped laminations.

6. An inside out motor as set forth in claim 5 wherein the inner legs of the first C-shaped laminations are shorter than the outer legs of the first C-shaped laminations.

7. An inside out motor as set forth in claim 5 wherein the side portions on opposite sides of the central portion of each ferromagnetic member include different numbers of second C-shaped laminations.

8. An inside out motor as set forth in claim 7 wherein the outer legs of the first C-shaped laminations in the central portion of the ferromagnetic members are tapered toward their free ends thereby to reduce inductance between circumferentially adjacent ferromagnetic members.

9. An inside out motor as set forth in claim 4 wherein the C-shaped laminations comprise first and second C-shaped laminations each having a radially inner leg and a radially outer leg, the outer legs of the first C-shaped laminations being wider than the outer legs of the second C-shaped laminations, each ferromagnetic member comprising a central portion made up of the first laminations and side portions on either side of the central portion made up of the second C-shaped laminations whereby the central portion protrudes radially outwardly from the side portions.

10. An inside out motor as set forth in claim 8 wherein the inner legs of the first C-shaped laminations are wider than the inner legs of the second C-shaped laminations.

11. An inside out motor as set forth in claim 4 wherein at least some of the C-shaped laminations of each of the first and second ferromagnetic members are offset from others of the C-shaped laminations of the ferromagnetic member in directions generally radially of the longitudinal axis of the rotor shaft.

12. An inside out motor as set forth in claim 11 wherein each of the C-shaped laminations has a radially inner leg and a radially outer leg, the inner and outer legs of the laminations in each of the first and second ferromagnetic members being arranged generally along parallel arcs.

13. An inside out motor as set forth in claim 11 wherein each of the C-shaped laminations has a radially inner leg and a radially outer leg, the inner and outer legs of the laminations in each of the first and second ferromagnetic members being arranged generally along parallel lines.

14. An inside out motor as set forth in claim 1 wherein the stator assembly comprises a first end cap of polymer material, the first end cap being molded around the first ferromagnetic member, and a second end cap of polymer material, the second end cap being molded around the second ferromagnetic member, the second end cap being separate from the first end cap, the first and second end caps being mounted on opposite ends of said bearing means.

15. An inside out motor as set forth in claim 14 wherein the first ferromagnetic member is mounted on the first end cap with other ferromagnetic members of substantially identical construction, the ferromagnetic members on the first end cap being positioned at circumferentially spaced apart locations, and the second ferromagnetic member is mounted on the second end cap with other ferromagnetic members of substantially identical construction, the ferromagnetic members on the second end cap being positioned at circumferentially spaced apart locations.

16. An inside out motor as set forth in claim 15 wherein the motor further comprises a rotor position sensor, and wherein the second end cap has a pocket therein holding the position sensor, the pocket extending from the second end cap axially inwardly to a position adjacent said magnet means of the rotor.

17. An inside out motor as set forth in claim 16 wherein one of the first and second ferromagnetic member has a notch in an outer leg thereof, the pocket positioning the position sensor device in registration with the notch.

18. An inside out motor as set forth in claim 1 wherein the concave member has a spacer integral therewith which is operatively engaged with said bearing means to space the concave member from the bearing means.

19. An inside out motor as set forth in claim 1 wherein said bearing means comprises a unitary sleeve bearing impregnated with lubricant and sized to contain sufficient lubricant for the lifetime of the motor.

20. An inside out motor as set forth in claim 19 wherein the sleeve bearing includes a longitudinal throughhole receiving the rotor shaft therethrough, the throughhole having end portions of a smaller diameter than a central portion of the throughhole whereby the rotor shaft engages the sleeve bearing only in the end portions of the sleeve bearing.

21. An inside out motor as set forth in claim 19 wherein the sleeve bearing has a generally cylindrical exterior surface, and a portion protruding from the cylindrical surface, the motor further comprising an end cap molded around the bearing and over the protruding portion thereby to secure the bearing to the end cap.

22. An inside out motor as set forth in claim 1 in combination with a shroud on which the motor is mounted and a fan, the shroud being constructed for mounting the motor and fan on a rigid surface.

23. An inside out motor as set forth in claim 22 wherein the shroud comprises a central member on which the motor is mounted, and spokes projecting radially outwardly from the central member, the spokes being constructed to permit resilient flexing motion of the central member and motor about a torsion axis generally coincident with the longitudinal axis of the rotor shaft and to inhibit pivoting motion of the central member and motor about axes perpendicular to the torsion axis.

24. An inside out motor as set forth in claim 23 wherein the spokes each have a generally T shaped cross section including intersecting legs, one of the legs being curved.

25. An inside out motor as set forth in claim 24 wherein the spokes are arranged such that curved leg is disposed closest to the motor.

26. An inside out motor as set forth in claim 22 wherein the fan is made of electrically insulating material and comprises a hub and fan blades projecting radially outwardly from the hub, the hub covering the concave member of the rotor.

27. An inside out motor as set forth in claim 26 wherein the motor further comprises a stator end cap mounted on the shroud, the hub and stator end cap overlapping around the circumference of the stator end cap and being in closely spaced relation to substantially enclose the rotor and stator assembly while permitting rotation of the hub relative to the stator end cap.

28. An inside out motor as set forth in claim 22 wherein the motor further comprises a control board mounted on the motor, the control board including a power connection terminal thereon and being disposed in the central member of the shroud, the shroud central member having axially outwardly directed openings therein to permit a power connector to pass through the central member to the power connection terminal, the shroud further including support means engageable with the control board to support the control board when the power connector is disconnected from the terminal.

29. An inside out motor as set forth in claim 28 wherein said support means comprises supports formed integrally with the central member of the shroud and disposed adjacent the openings in the central member and engaging the control board adjacent to the power connection terminal.

30. An inside out motor as set forth in claim 1 wherein said magnet means extends substantially in a circle on the interior of the concave member of the rotor, said magnet means comprising magnetizable material magnetized in regions to define multiple pairs of north and south poles, the magnetized regions being skewed at the poles relative to an axially extending line.

31. An inside out motor comprising:

a rotor including a concave member, a shaft mounted on the concave member and magnet means mounted on an interior surface of the concave member, said magnet means being spaced from the shaft and extending circumferentially on the concave member around the longitudinal axis of the shaft;

bearing means receiving the shaft for rotatably mounting the rotor;

a stator assembly mounted on said bearing means, the stator assembly including a bobbin mounted generally coaxially with the rotor shaft and having an interior diameter and an exterior diameter, a winding wound on the bobbin and extending around the axis of the rotor shaft, the winding having a width in a direction parallel to the lengthwise extension of the rotor shaft, a first ferromagnetic member having a radially outer leg extending between the winding and the magnet, the outer leg extending generally from a first axial end of the bobbin toward an opposite second axial end a distance substantially less than the width of the winding, and a second ferromagnetic member including a radially outer leg extending generally from the second end of the bobbin toward the first end a distance substantially less than the width of the winding;

said first and second ferromagnetic members are disposed in angularly spaced positions around the longitudinal axis of the rotor shaft, each of said first and second ferromagnetic members being located so that the ferromagnetic member is asymmetrical about all planes including the longitudinal axis of the rotor shaft whereby the ferromagnetic members are each positioned to define an asymmetrical air gap between the ferromagnetic member and the rotor to facilitate starting the motor.

32. An inside out motor as set forth in claim 31 wherein said first and second ferromagnetic members each comprise a plurality of laminations disposed in a stack defining the ferromagnetic member, the laminations being oriented so that the laminations lie in planes parallel to the longitudinal axis of the rotor shaft.

33. An inside out motor comprising:

a rotor including a concave member, a shaft mounted on the concave member and magnet means mounted on an interior surface of the concave member, said magnet means being spaced from the shaft and extending circumferentially on the concave member around the longitudinal axis of the shaft;

bearing means receiving the shaft for rotatably mounting the rotor;

a stator assembly mounted on said bearing means, the stator assembly including a bobbin mounted generally coaxially with the rotor shaft and having an interior diameter and an exterior diameter, a winding wound on the bobbin and extending around the axis of the rotor shaft, the winding having a width in a direction parallel to the lengthwise extension of the rotor shaft, a first ferromagnetic member having a radially outer leg extending between the winding and the magnet, the outer leg extending generally from a first axial end of the bobbin toward an opposite second axial end, and a second ferromagnetic member including a radially outer leg extending generally from the second end of the bobbin toward the first end;

said first and second ferromagnetic members are disposed in angularly spaced positions around the longitudinal axis of the rotor shaft, each of said first and second ferromagnetic members being located so that the ferromagnetic member is asymmetrical about all planes including the longitudinal axis of the rotor shaft whereby the ferromagnetic members are each positioned to define an asymmetrical air gap between the ferromagnetic member and the rotor to facilitate starting the motor.

34. An inside out motor as set forth in claim 33 wherein the first and second ferromagnetic members are each in radially opposed relation to said magnet means of the rotor, the first and second ferromagnetic members and said magnet means defining respective air gaps therebetween having circumferentially opposite ends, the air gap being greater at one of the circumferentially opposite ends than at the other circumferentially opposite end.

35. An inside out motor as set forth in claim 33 wherein said first and second ferromagnetic members each comprise a plurality of generally C-shaped laminations disposed in a stack defining the ferromagnetic member, the laminations being oriented so that the laminations lie in planes parallel to the longitudinal axis of the rotor shaft.

36. An inside out motor as set forth in claim 35 wherein the C-shaped laminations comprise first and second C-shaped laminations each having a radially inner leg and a radially outer leg, the outer legs of the first C-shaped laminations being longer than the outer legs of the second C-shaped laminations, at least some of the ferromagnetic members comprising a central portion made up of the first laminations and side portions on either side of the central portion made up of the second C-shaped laminations.

37. An inside out motor as set forth in claim 36 wherein the inner legs of the first C-shaped laminations are shorter than the outer legs of the first C-shaped laminations.

38. An inside out motor as set forth in claim 36 wherein the side portions on opposite sides of the central portion of each ferromagnetic member include different numbers of second C-shaped laminations.

39. An inside out motor as set forth in claim 38 wherein the outer legs of the first C-shaped laminations in the central portion of the ferromagnetic members are tapered toward their free ends thereby to reduce inductance between circumferentially adjacent ferromagnetic members.

40. An inside out motor as set forth in claim 35 wherein the C-shaped laminations comprise first and second C-shaped laminations each having a radially inner leg and a radially outer leg, the outer legs of the first C-shaped laminations being wider than the outer legs of the second C-shaped laminations, each ferromagnetic member comprising a central portion made up of the first laminations and side portions on either side of the central portion made up of the second C-shaped laminations whereby the central portion protrudes radially outwardly from the side portions.

41. An inside out motor as set forth in claim 40 wherein the inner legs of the first C-shaped laminations are wider than the inner legs of the second C-shaped laminations.

42. An inside out motor as set forth in claim 35 wherein at least some of the C-shaped laminations of each of the first and second ferromagnetic members are offset from others of the C-shaped laminations of the ferromagnetic member in directions generally radially of the longitudinal axis of the rotor shaft.

43. An inside out motor as set forth in claim 42 wherein each of the C-shaped laminations has a radially inner leg and a radially outer leg, the inner and outer legs of the laminations in each of the first and second ferromagnetic members being arranged generally along parallel arcs.

44. An inside out motor as set forth in claim 42 wherein each of the C-shaped laminations has a radially inner leg and a radially outer leg, the inner and outer legs of the laminations in each of the first and second ferromagnetic members being arranged generally along parallel lines.

45. An inside out motor as set forth in claim 33 wherein the stator assembly comprises a first end cap of polymer material, the first end cap being molded around the first ferromagnetic member, and a second end cap of polymer material, the second end cap being molded around the second ferromagnetic member, the second end cap being separate from the first end cap, the first and second end caps being mounted on opposite ends of said bearing means.

46. An inside out motor as set forth in claim 45 wherein the first ferromagnetic member is mounted on the first end cap with other ferromagnetic members of substantially identical construction, the ferromagnetic members on the first end cap being positioned at circumferentially spaced apart locations, and the second ferromagnetic member is mounted on the second end cap with other ferromagnetic members of substantially identical construction, the ferromagnetic members on the second end cap being positioned at circumferentially spaced apart locations.

47. An inside out motor as set forth in claim 46 wherein the motor further comprises a rotor position sensor, and wherein the second end cap has a pocket therein holding the position sensor, the pocket extending from the second end cap axially inwardly to a position adjacent said magnet means of the rotor.

48. An inside out motor as set forth in claim 47 wherein one of the first and second ferromagnetic member has a notch in an outer leg thereof, the pocket positioning the position sensor device in registration with the notch.

49. An inside out motor as set forth in claim 33 wherein the concave member has a spacer integral therewith which is operatively engaged with said bearing means to space the concave member from the bearing means.

50. An inside out motor as set forth in claim 33 wherein said bearing means comprises a unitary sleeve bearing impregnated with lubricant and sized to contain sufficient lubricant for the lifetime of the motor.

51. An inside out motor as set forth in claim 50 wherein the sleeve bearing includes a longitudinal throughhole receiving the rotor shaft therethrough, the throughhole having end portions of a smaller diameter than a central portion of the throughhole whereby the rotor shaft engages the sleeve bearing only in the end portions of the sleeve bearing.

52. An inside out motor as set forth in claim 51 wherein the sleeve bearing has a generally cylindrical exterior surface, and a portion protruding from the cylindrical surface, the motor further comprising an end cap molded around the bearing and over the protruding portion thereby to secure the bearing to the end cap.

53. An inside out motor as set forth in claim 33 in combination with a shroud on which the motor is mounted and a fan, the shroud being constructed for mounting the motor and fan on a rigid surface.

54. An inside out motor as set forth in claim 53 wherein the shroud comprises a central member on which the motor is mounted, and spokes projecting radially outwardly from the central member, the spokes being constructed to permit resilient flexing motion of the central member and motor about a torsion axis generally coincident with the longitudinal axis of the rotor shaft and to inhibit pivoting motion of the central member and motor about axes perpendicular to the torsion axis.

55. An inside out motor as set forth in claim 54 wherein the spokes each have a generally T shaped cross section including intersecting legs, one of the legs being curved.

56. An inside out motor as set forth in claim 55 wherein the spokes are arranged such that curved leg is disposed closest to the motor.

57. An inside out motor as set forth in claim 53 wherein the fan is made of electrically insulating material and comprises a hub and fan blades projecting radially outwardly from the hub, the hub covering the concave member of the rotor.

58. An inside out motor as set forth in claim 57 wherein the motor further comprises a stator end cap mounted on the shroud, the hub and stator end cap overlapping around the circumference of the stator end cap and being in closely spaced relation to substantially enclose the rotor and stator assembly while permitting rotation of the hub relative to the stator end cap.

59. An inside out motor as set forth in claim 53 wherein the motor further comprises a control board mounted on the motor, the control board including a power connection terminal thereon and being disposed in the central member of the shroud, the shroud central member having axially outwardly directed openings therein to permit a power connector to pass through the central member to the power connection terminal, the shroud further including support means engageable with the control board to support the control board when the power connector is disconnected from the terminal.

60. An inside out motor as set forth in claim 59 wherein said support means comprises supports formed integrally with the central member of the shroud and disposed adjacent the openings in the central member and engaging the control board adjacent to the power connection terminal.

61. An inside out motor as set forth in claim 33 wherein said magnet means extends substantially in a circle on the interior of the concave member of the rotor, said magnet means comprising magnetizable material magnetized in regions to define multiple pairs of north and south poles, the magnetized regions being skewed at the poles relative to an axially extending line.

62. An inside out motor as set forth in claim 33 wherein the outer legs of each of said first and second ferromagnetic members are tapered toward their free ends thereby to reduce inductance between circumferentially adjacent ferromagnetic members.

63. An inside out motor comprising:
   a rotor including a concave member, a shaft mounted on the concave member and magnet means mounted on an interior surface of the concave member, said magnet means being spaced from the shaft and extending circumferentially on the concave member around the longitudinal axis of the shaft;
   bearing means receiving the shaft for rotatably mounting the rotor;
   a stator assembly mounted on said bearing means, the stator assembly including a bobbin mounted generally coaxially with the rotor shaft and having an interior diameter and an exterior diameter, a winding wound on the bobbin and extending around the axis of the rotor shaft, the winding having a width in a direction parallel to the lengthwise extension of the rotor shaft, a first ferromagnetic member having a radially outer leg extending between the winding and the magnet, the outer leg extending generally from a first axial end of the bobbin toward an opposite second axial end a distance substantially less than the width of the winding, and a second ferromagnetic member including a radially outer leg extending generally from the second end of the bobbin toward the first end a distance substantially less than the width of the winding, such that the leakage inductance between the members is reduced;
   the stator assembly comprising a first end cap of polymer material, the first end cap being molded around the first ferromagnetic member, and a second end cap of polymer material, the second end cap being molded around the second ferromagnetic member, the second end cap being separate from the first end cap, the first and second end caps being mounted on opposite ends of said bearing means;
   the first ferromagnetic member being mounted on the first end cap with other ferromagnetic members of substantially identical construction, the ferromagnetic members on the first end cap being positioned at circumferentially spaced apart locations, and the second ferromagnetic member is mounted on the second end cap with other ferromagnetic members of substantially identical construction, the ferromagnetic members on the second end cap being positioned at circumferentially spaced apart locations;
   the motor further comprising a rotor position sensor, and wherein the second end cap has a pocket therein holding the position sensor, the pocket extending from the second end cap axially inwardly to a position adjacent said magnet means of the rotor.

64. An inside out motor as set forth in claim 63 wherein one of the first and second ferromagnetic member has a notch in an outer leg thereof, the pocket positioning the position sensor device in registration with the notch.

65. An inside out motor in combination with a shroud on which the motor is mounted and a fan, the motor comprising:
   a rotor including a concave member, a shaft mounted on the concave member and magnet means mounted on an interior surface of the concave member, said magnet means being spaced from the shaft and extending circumferentially on the concave member around the longitudinal axis of the shaft;
   bearing means receiving the shaft for rotatably mounting the rotor;
   a stator assembly mounted on said bearing means, the stator assembly including a bobbin mounted generally coaxially with the rotor shaft and having an interior diameter and an exterior diameter, a winding wound on the bobbin and extending around the axis of the rotor shaft, the winding having a width in a direction parallel to the lengthwise extension of the rotor shaft, a first ferromagnetic member having a radially outer leg extending between the winding and the magnet, the outer leg extending generally from a first axial end of the bobbin toward an opposite second axial end a distance substantially less than the width of the winding, and a second ferromagnetic member including a radially outer leg extending generally from the second end of the bobbin toward the first end a distance substantially less than the width of the winding, such that the leakage inductance between the members is reduced;
   the shroud being constructed for mounting the motor and fan on a rigid surface;
   the motor further comprising a control board mounted on the motor, the control board including a power connection terminal thereon and being disposed in the central member of the shroud, the shroud central member having axially outwardly directed openings therein to permit a power connector to pass through the central member to the power connection terminal, the shroud further including support means engageable with the control board to support the control board when the power connector is disconnected from the terminal.

66. An inside out motor as set forth in claim 65 wherein said magnet means extends substantially in a circle on the interior of the concave member of the rotor, said magnet means comprising magnetizable material magnetized in regions to define multiple pairs of north and south poles, the magnetized regions being skewed at the poles relative to an axially extending line.

* * * * *